US012464389B2

(12) United States Patent
Tallapaneni et al.

(10) Patent No.: US 12,464,389 B2
(45) Date of Patent: Nov. 4, 2025

(54) SYSTEMS AND METHODS FOR MITIGATING RADIO-FREQUENCY LATENCY IN WIRELESS CONTROLLERS

(71) Applicant: VIZIO, INC., Irvine, CA (US)

(72) Inventors: Kishore Tallapaneni, Flower Mound, TX (US); Maksym Shestirko, Addison, TX (US); Rammohan Somalraju, Irving, TX (US); Oleksandr Blazhko, Des Plaines, IL (US); W. Leo Hoarty, Morgan Hill, CA (US)

(73) Assignee: VIZIO, INC., Irvine, CA (US)

( * ) Notice: Subject to any disclaimer, the term of this patent is extended or adjusted under 35 U.S.C. 154(b) by 481 days.

(21) Appl. No.: 17/981,205

(22) Filed: Nov. 4, 2022

(65) Prior Publication Data
US 2023/0141658 A1 May 11, 2023

Related U.S. Application Data

(60) Provisional application No. 63/399,817, filed on Aug. 22, 2022, provisional application No. 63/277,921, filed on Nov. 10, 2021.

(51) Int. Cl.
*H04W 24/08* (2009.01)
*H04B 17/364* (2015.01)
*H04W 4/80* (2018.01)
*H04W 24/10* (2009.01)

(52) U.S. Cl.
CPC .......... *H04W 24/08* (2013.01); *H04B 17/364* (2015.01); *H04W 4/80* (2018.02); *H04W 24/10* (2013.01)

(58) Field of Classification Search
CPC ....... H04W 24/10; H04W 24/08; H04W 4/80; H04N 21/439; H04N 21/43076; H04B 17/364
USPC .......................................... 370/252
See application file for complete search history.

(56) References Cited

U.S. PATENT DOCUMENTS

| 11,997,343 | B2 * | 5/2024 | Tallapaneni | H04N 21/43076 |
| 2016/0282965 | A1 * | 9/2016 | Jensen | G06F 3/04162 |
| 2019/0098293 | A1 * | 3/2019 | Lee | H04N 17/04 |
| 2019/0116395 | A1 * | 4/2019 | Kerdranvat | H04N 21/439 |
| 2019/0321725 | A1 * | 10/2019 | Zimring | A63F 13/335 |

* cited by examiner

Primary Examiner — Jungwon Chang
(74) Attorney, Agent, or Firm — POLSINELLI LLP

(57) ABSTRACT

Systems and method are provided for detecting latency in radio frequency connections. A computing device may present a first cue at a first time. In response, the computing device may receive a first input from a wireless device at a second time that indicates that a control of the wireless device associated with the first cue has been activated. The computing device may define a signal latency value based on the first time and the second time. The computing device may then receive a second input from the wireless device that includes an indication of a control activation at a third time. And in response, the computing device may process the control activation if the control activation is received at a fourth time that is prior to the third time. The time interval between the fourth time and the third time can be equal to the signal latency value.

20 Claims, 14 Drawing Sheets

Uncompensated Target Table 1001

| Frame | Target X | Target Y | Weapon X | Weapon Y | Button | Hit |
|---|---|---|---|---|---|---|
| A | 99.57 | 12.54 | 71.55 | 16.79 | 0 | 0 |
| B | 93.34 | 14.55 | 82.65 | 16.79 | 0 | 0 |
| C | 89.75 | 16.79 | 89.75 | 16.79 | 0 | 0 |
| D | - | - | - | - | - | - |
| E | - | - | - | - | - | - |

Latency Compensated Target Table (-2 Frames) 1002

| Frame | Target X | Target Y | Weapon X | Weapon Y | Button | Hit |
|---|---|---|---|---|---|---|
| A | 99.57 | 12.54 | 71.55 | 16.79 | 0 | 0 |
| B | 93.34 | 14.55 | 82.65 | 16.79 | 0 | 0 |
| C | 89.75 | 16.79 | 89.75 | 16.79 | 0 | 0 |
| D | 82.33 | 17.55 | 93.55 | 16.79 | 0 | 0 |
| E | 76.25 | 23.44 | 73.15 | 16.79 | 1 | 1 |

Control Activation 1003

Interactive service subtracts two frame times using latency value 1005

Control Activation event is received. 1004

Total wireless controller latency 903 = 2 frame times

Interactive service calculates successful targeting. 1006

FIG. 10

SYSTEMS AND METHODS FOR MITIGATING RADIO-FREQUENCY LATENCY IN WIRELESS CONTROLLERS

CROSS-REFERENCE TO RELATED APPLICATIONS

The present patent application claims the benefit of priority to U.S. Provisional Patent Application No. 63/277,921 filed Nov. 10, 2021, and to U.S. Provisional Patent Application No. 63/399,817 filed Aug. 22, 2022, which are both incorporated herein by reference in their entirety for all purposes.

TECHNICAL FIELD

This disclosure relates generally to detecting radio-frequency signal latency, and more particularly to compensating for radio-frequency signal latency between wireless devices.

BACKGROUND

Signal latency in a connection between wireless devices may be caused by a variety of sources such as the distance between the wireless devices, environmental factors (e.g., atmospheric conditions, humidity, surfaces between the wireless device and the signal source, etc.), noise, etc. The severity of the effect of the signal latency on the operations of the wireless devices may depend on the wireless devices. For example, internet-of-things devices may not be impacted by small delays in transmission time between devices. However, signal latency may have a larger impact on time-sensitive operations such as when the operations of wireless devices operate in a synchronized manner.

SUMMARY

Methods and systems are described herein for mitigating signal latency in radio frequency connections. The method includes: presenting a first cue at a first time; receiving, in response to presenting the first cue, a first input from a wireless device at a second time, the first input including an indication that a control of the wireless device associated with the first cue has been activated; defining a signal latency value based on the first time and the second time; receiving, at a third time, a second input from the wireless device that includes an indication of a control activation; and processing the control activation as if the control activation is received at a fourth time that is prior to the third time, wherein the time interval between the fourth time and the third time is equal to the signal latency value.

The systems described herein may mitigate signal latency in radio frequency connections. The systems include one or more processors and a non-transitory computer-readable medium storing instructions that, when executed by the one or more processors, cause the one or more processors to perform any of the methods as previously described.

The non-transitory computer-readable media described herein may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 10 illustrates example state data tables that store state information associated with objects of an interactive service for mitigating signal latency in a connection between a wireless controller and a computing device of the interactive service according to aspects of the present disclosure.

DETAILED DESCRIPTION

Figure 1:
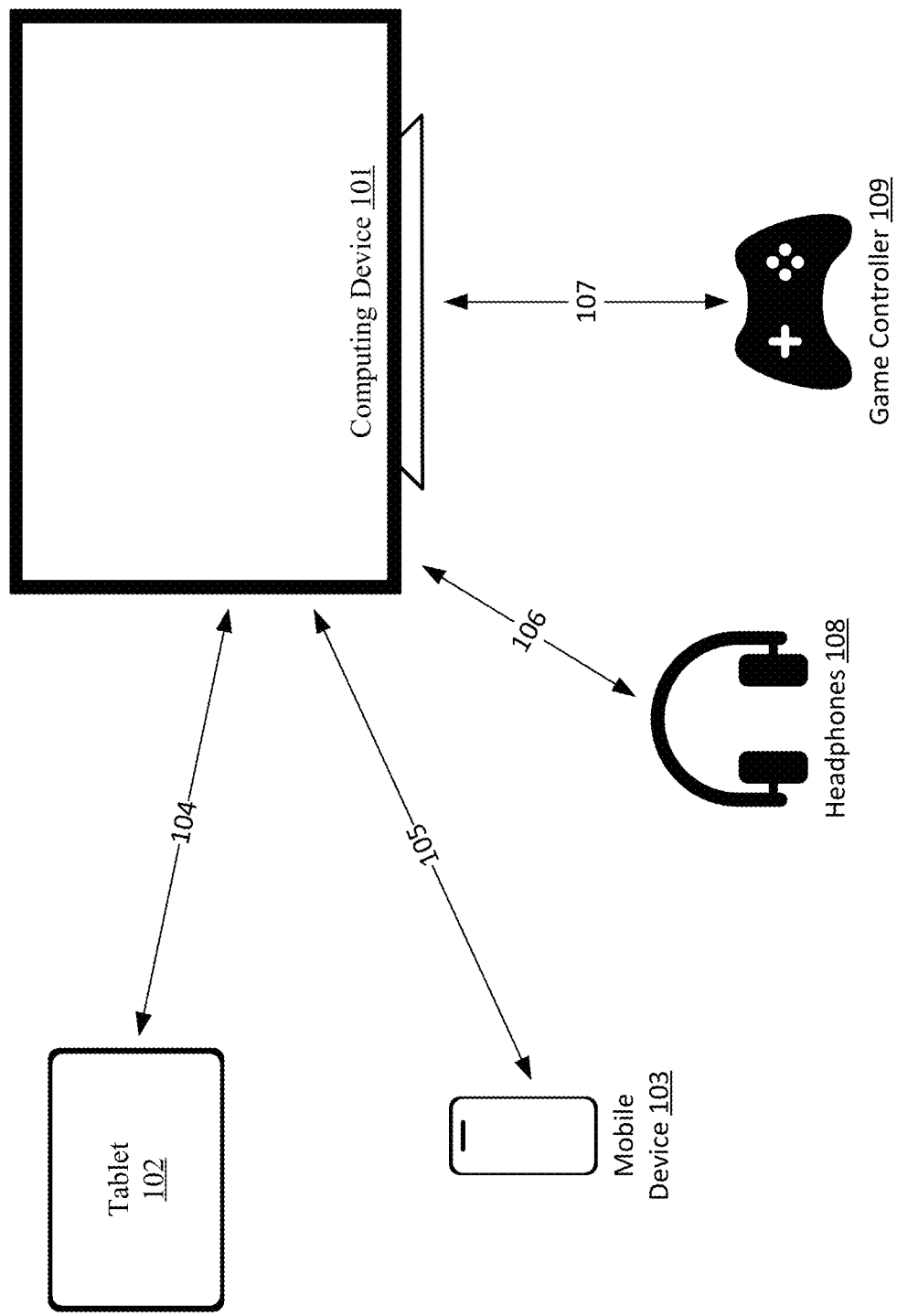
FIG. 1 illustrates an example system in which signal latency can be detected and mitigated in connections with wireless devices according to aspects of the present disclosure.

Signal latency (e.g., time interval between when a signal is transmitted to the signal is received or when the receive signal is processed) may impact some operations of wireless devices such as time sensitive operations. For example, Bluetooth headphones may be connected to a display device to present an audio component of media being presented by the display device. Signal latency between the display device and the headphones may cause the audio being presented to lag behind the corresponding video displayed by the display device. Signal latency may be caused by a distance between the wireless device and the signal source, the environment (e.g., surfaces between the wireless device and the signal source, material composition of those surfaces, etc.), atmospheric conditions, noise, error correction methodologies, and/or the like.

The present disclosure includes systems and methods for detecting and mitigating signal latency within wireless devices. Signal latency may be detected according to one or more detection process selected based on the capabilities of the transmitting and/or receiving device. In some instances, the capabilities of a first device and/or a second device may be detected using communications transmitted to and/or from the respective devices. For example, data within the communications and/or characteristics of the transmissions may be used to identify the transmitting device, which may in turn be used to determine the capabilities of the transmitting device. A detection process may then be selected and executed based on the detected capabilities.

The detection process may derive one or more signal latency measurements from communications between transmitted between the first service and second device. The one or more signal latency measurements may be used to derive an overall signal latency that characterizes the connection between the first device and the second device. The overall signal latency may be a statistical representation of the one or more signal latency measurements such as, but not limited to, a mean signal latency measurement, a median signal latency measurement, a mode signal latency measurement, etc.

One or more mitigation processes may then be defined that when executed modify the operations of the first device and/or the second device to reduce or eliminate the effect of the signal latency. The one or more mitigation processes may be defined based on the overall signal latency, the capabilities of the first device, the capabilities of the second device, the operations to be provided by the first device and/or the second device, and/or the like. The mitigation process may be defined by a remote device, the first device, and/or the second device. Once defined, the one or more mitigation processes may be transmitted to the first device and/or the second device to modify the operations of the first device and/or the second device respectively. Alternatively, the one or more mitigation processes may be predefined. In those instances, the first device and/or the second device may receive a communication that includes an identification of the one or more mitigation processes that are to be executed, a first timestamp or time interval indicating when the one or more mitigation processes are to be executed, an identification of an event and/or second timestamp indicating when the operations of the device are to revert to pre-mitigation process operations, and/or the like. The first device and/or the second device may receive the communication, identify the one or more mitigation processes in memory (or otherwise obtain them from a local or remote database), and execute the one or more mitigation processes according to the first timestamp or time interval.

In an illustrative example, a computing device may operate an interactive service such as a video game service or the like. The computing device may establish a connection with one or more wireless devices usable with the interactive service. For instance, a first wireless device may include a wireless controller through which a user may interact with the interactive service. A second wireless device may include wireless headphones configured to present an audio component of the interactive service and/or transmit audio communications (such as speech, etc.) to the interactive service. Other wireless devices with similar or different capabilities may also be connected to the computing device for use with the interactive service.

Signal latency may impact the operations of the interactive service. For example, in a first-person shooter (FPS) type video game the user may operate the wireless controller to aim a weapon at a moving target (e.g., using a mouse, joystick, or the like). The user may activate a control of the wireless controller once a reticle of the weapon is positioned at a same coordinates as the target. However, due to the signal latency, the interactive service may receive the indication of the control activation at some time after the control was activated when the reticle of the weapon is positioned at different coordinates from the target (e.g., the target continued moving, the reticle continued moving, etc.). In another example, the interactive service may include a player-controlled character that may be tasked with reaching a particular location within a virtual environment filled with platforms and obstacles. The signal latency of the connection with the wireless controller may prevent the user from being able to accurately control the character to avoid obstacles or reach the appropriate platforms, etc.

The interactive service may receive a communication from the wireless that includes an indication that one or more controls have been activated. A control activation may include, but is not limited to, a button press, change in pressure applied to a control (e.g., for pressure sensitive controls), a change in the position of a joystick or lever, use of or change in position while using a trackpad, input or change in input from a directional pad (D-pad), input or change in input from a touchpad, or the like. The interactive service may process the control by executing an action within the virtual environment (e.g., firing a weapon, causing an action to be performed, causing a character to move, etc.).

The computing device may store a state data structure of the interactive service and/or the objects therein. The state data structure may be generated in regular interval and/or upon detecting a change in an object of the interactive service (e.g., such as an object moving, an action being performed, etc.). The state data structure may include an identification of characteristics of the virtual environment, objects within the virtual environment, the player-controlled entity, a timestamp or sequence identifier indicating when the state was generated, and/or the like. The state data structure may be used to recreate the state of the interactive service at a particular time, process control activations at particular times (e.g., retroactively), and/or the like.

Upon connecting to the wireless controller, the computing device defines a detection process to measure (or approximate) the signal latency of the connection with the wireless controller. The computing device may use an identifier of the wireless controller (or alternatively, one or more data packets transmitted by the wireless controller, user input, the interactive service, and/or the like) to determine the capabilities of the wireless controller. The computing device may then define a detection process based on the capabilities of the wireless controller.

In some examples, the detection process may include presenting, by the computing device, a cue including a representation of one or more controls of the wireless controller while simultaneously starting a timer and/or generating a first timestamp. The computing device may wait until an indication of a control activation corresponding to the control represented by the cue is received. Upon receiving the indication, the computing device may terminate the timer and/or generate a second timestamp. The computing device may define a signal latency value that is equal to the timer value when the timer terminated. Alternatively, the signal latency value may be defined based on the first timestamp and the second timestamp (e.g., by determining the difference between the first timestamp and the second timestamp, etc.).

Alternatively, the computing device may use other sensors of the wireless controller configured to detect input from the computing device (e.g., such as an optical sensor, a microphone or other sound sensor, or the like). For example, the computing device may generate an output (e.g., such as light or sound) that the wireless controller is configured to detect and start the timer. The computing device may stop the timer upon receiving an indication that the output was detected. The wireless device may automatically transmit a data packet in response to detecting the output. Alternatively, a user may activate a control in response to detecting the output, which may cause a data packet to be transmitted to the computing device.

Since the timer value may be affected by a reaction time interval (e.g., the time interval between when the one or more symbols are displayed, and when the corresponding one or more controls are activated). For example, the signal latency value may equal the signal latency of the connection plus the reaction latency caused by the reaction time of the user. To reduce the impact of the reaction latency, the computing device may execute the control-based detection process over multiple iterations to generate multiple signal latency values. The multiple signal latency values may be processed to reduce or eliminate the reaction latency from the signal latency value.

Processing the signal latency values may include selecting a particular signal latency value from the multiple signal latency values, using a statistical algorithm (e.g., regression, clustering, machine-learning, etc.), using a machine-learning mode, based on user input, etc. For example, the computing device may select the smallest signal latency value from the multiple signal latency values the signal latency value least impacted by reaction latency. In other instances, the computing device may generate an overall timer value (e.g., corresponding to an average, median, mode, etc. of the multiple timer values, or the like). In some instances, the overall signal latency value may be reduced by a predetermined quantity (e.g., 150-300 milliseconds, based on an age of the user, user input, and/or the like). The computing device may determine that the overall signal latency value corresponds to the signal latency of the connection.

In some instances, the computing device may execute the detection process using another device to prevent the reaction latency from impacting the measured signal latency value. For example, the computing device may establish a connection with a mobile device (e.g., such as a smartphone or tablet), configured to detect the output from the computing device. The new device may be connected via the same wireless protocol used for the connection between the wireless controller and the computing device. The new device may generate an output (e.g., audio, light, etc.) and transmit a data packet. The computing device may detect the output and start a timer (and/or generate a first timestamp). The timer may be terminated (and/or a second timestamp may be generated) when the corresponding data packet is received. The timer value when the timer terminated may correspond to a signal latency value.

In some instances, the computing device may then perform the detection process to improve the accuracy of the measured signal latency. The computing device may generate an output and start a timer. The new device may transmit a data packet to the computing device in response to detecting the output. The computing device may then stop the timer generating a second signal latency value. The two signal latency values may be averaged or further processed to derive an overall signal latency value characterizing the connection between the new device and the computing device. The computing device may define the signal latency of other connections of the computing device that use a same communication protocol (e.g., between the computing device and other devices such has the wireless controller) to the overall signal latency value. As a result, the signal latency value of the connection between the computing device and the new device should be approximately equal to the signal latency value of the connection between the computing device and the wireless device.

The computing device may then execute a mitigation process in response to deriving the signal latency. The mitigation process may be defined based on the signal latency of the connection, the capabilities of the wireless controller and/or the computing device, the service for which the wireless controller is being utilized, and/or the like. The mitigation process may be dynamically defined (e.g., at runtime in response to a detected signal latency) or predefined and dynamically configured at runtime based on the signal latency, capabilities of the wireless controller and/or the computing device, etc. The mitigation process may be executed by the computing device, the service operating on the computing device for which the wireless video game control is being utilized, and/or on the wireless controller.

In some examples, a mitigation process may include recording a control activation at an approximate time in which the control activation occurred (e.g., a button is actuated) rather than when the indication of that control activation is received by the computing device. For example, a control (e.g., such as a button) may be activated at time T but be received by the computing device and/or the interactive service at time T+L (where L corresponds to the signal latency value). When the computing device and/or interactive service receives an indication of the control activation at time T+L, the computing device and/or service may identify the state data structure of the interactive service at time (T+L)−L or T. The computing device and/or interactive service may then process the control activation as if the control activation was received at time T by determining a result of the control activation on the state data structure that corresponds to time T. Alternatively, the computing device and/or interactive service may modify the state data structure corresponding to time T based on the control activation. In some instances, the computing device and/or interactive service may also modify the state data structures between time T and T+L based on the control activation occurring at time T.

In other examples, the mitigation process may be executed by the wireless controller. The wireless controller may transmit one or more timestamps with each indication of a control activation. The one or more timestamps may direct the computing device and/or interactive service to process the control activation at a particular time. The one or more timestamps may include a first timestamp that corresponds to the current time T (e.g., Unix epoch time, a current time synchronized with the service, a time relative to when the wireless controller was switched on or connected to the computing device and/or service, and/or the like). Alternatively, the first timestamp may be modified to account for the signal latency (e.g., first time stamp=T-L), and/or the like. The computing device and/or service may process the control activations according to the timestamp included in the communication. The mitigation process may reduce or eliminate the effect of the signal latency by causing the computing device and/or service to process control activations according to the time the control activation occurred rather than the time in which the indication of the control activation is received by the computing device and/or interactive service.

Signal latency may be detected and/or mitigated in other wireless devices. The detection and/or mitigation processes may be dynamically adapted, modified, or the like to the other wireless devices based on the capabilities of each respective other wireless device. For example, wireless headphones may be used in conjunction with the wireless controller of the preceding illustrative example. The computing device may define a different detection and/or mitigation process for the wireless headphones due to the different capabilities of the wireless headphones from the wireless controller.

For instance, since the wireless headphones lack controls that can be activated, the computing device may execute a detection process using another device such as a mobile device. In addition, since the wireless headphones present the audio component of the interactive service without providing input to the interactive service, the mitigation process may be based on synchronizing the audio component presented by the wireless headphones with the video component presented by the computing device (e.g., by delaying the video component, or the like).

The detection and/or mitigation processes may be executed any number of times during the communication session between the computing device and a wireless device. For example, the detection process may execute once (e.g., when the computing device connects to the wireless device, upon receiving user input, etc.), multiple times (e.g., in regular intervals, after a time interval expires, upon receiving user input, etc.), and/or the like. In some examples, the detection process may execute once when facilitated by an external device (e.g., the new device as previously described) to prevent interfering with the presentation of the media or interactive service by the computing device.

The detection process may execute more than once when the detection process can be executed by the computing device or the wireless device without interfering with the operations of the computing device. For example, the computing device may define a detection process that includes transmitting a particular output that can be detected by the wireless device (e.g., such as a particular video frame, flash of light, sound, etc.) while being minimally detectable by the user. The wireless device may detect the output and transmit a data packet. The computing device record the signal latency as the time between generating the output and receiving the data packet. The mitigation process may be executed while the computing device is presenting media and/or operating the interactive service without impacting the presentation of the media or the interactive service. The computing device may periodically execute the detection process or execute the detection process upon detecting a particular event (e.g., such as an event indicative of a change in the signal latency previously measured, etc.).

A mitigation process may be executed each time a detection process executes to synchronize the operations of the wireless device with the computing device. Alternatively, the mitigation process may be executed once, the first time the detection process executes for a particular wireless device. The computing device may execute a subsequent mitigation process upon determining that a change in the measured signal latency value.

FIG. 1 illustrates a block diagram of an example system in which signal latency can be detected and mitigated in connections with wireless devices according to aspects of the present disclosure. Some devices may be configured to extend functionality of the device using one or more connected wireless devices. Computing device 101 may be a device configured to augment operations and/or services of computing device 101 using one or more wireless devices. Computing device 101 may be or include, but is not limited to, personal computers, servers, display devices, mobile devices such as smartphones or tablets, televisions, and/or the like. Computing device 101 may include one or more transceivers configured to connect to tablet 102, mobile device 103 (e.g., smartphone, tablet, mobile computing devices, etc.), wireless headphones 108, wireless controller 109, and/or the like. The one or more transceivers may be configured to communicate using oner or more wireless protocols such as, but not limited to, Wi-Fi, Bluetooth, Zigbee, Z-wave, etc.

Computing device 101 may establish a connection 104 with tablet 102 and/or connection 105 mobile device 103 using a wireless communication protocol (e.g., such, but not limited to, Bluetooth, Wi-Fi, Zigbee, Z-wave, etc.). Once established, tablet 102 or mobile device 103 may be used to interact with computing device 101 by, for example, controlling the operations of computing device 101 (e.g., changing settings, volume, channels, etc.), mirroring computing device 101 (e.g., causing the media being displayed by computing device 101 to be displayed by tablet 102 and/or mobile device 103, causing the media being displayed by tablet 102 and/or mobile device 103 to be displayed computing device 101, etc.), viewing additional information associated with media being displayed by computing device 101 (e.g., such as information associated with a show or movie, information associated with an advertisement, an advertisement contextually related to the media, etc.), facilitating a connection with other devices (e.g., such as connection 106 with wireless headphones 108, connection 107 with wireless controller 109, etc.), and/or the like.

Computing device 101 may include some functions that rely on other wireless devices. For example, computing device 101 may establish connection 106 with wireless headphones 108 via a wireless communication protocol. Once connected, computing device 101 may transmit the audio component of media to be presented by computing device 101 to wireless headphones 108 while computing device 101 may present the video component of the media. Connection 106 may unidirectional (e.g., one way from computing device 101 to wireless headphones 108) as shown or bidirectional. In another example, computing device 101 may operate an interactive service such as, but not limited to, a video game service, that may be operated by a user with a controller such wireless controller 109. Computing device 101 may operate other interactive services that may be operated by the user with other controllers, tablet 102, mobile device 103, and/or other wireless devices.

Computing device 101 may establish connection 107 with wireless controller via a wireless communication protocol. Once connected, computing device 101 may receiving communications from wireless controller 109 indicative of activation of one or more controls of wireless controller 109 (e.g., joystick movement from a previous position of the joystick, a button press, a change in pressure applied to a button, etc.). Computing device 101 may receive the communication and pass the communication to the service, which may process the activation of the one or more controls. The service may output the result of the activation of the one or more controls to the display of computing device 101. Connection 107 may be unidirectional (e.g., one way from wireless controller 109 to computing device 101) as shown or bidirectional.

The quality of some operations of computing device 101 may be impacted by the nature of wireless communications. Synchronization or time sensitive applications may be impacted by signal latency which may when or how communications can be processed from wireless devices. Signal latency may occur due to characteristics of the wireless protocol being used, interference (e.g., due other devices or noise broadcasting or the same or nearby frequencies, environmental conditions, objects within the environment that may impede or radio frequency signals, etc.), a distance between the wireless device and computing device 101, etc.

For instance, computing device 101 may establish connection 106 to enable wireless headphones 108 to present the audio component that corresponds to video displayed by computing device 101. Signal latency in connection 106 may cause the audio component to be received by wireless headphones 108 after the corresponding video component is displayed. The audio component may continue to be delayed behind the video component for as long as the wireless headphones 108 are presenting the audio component. Signal latency in connection 106 may cause an indication of a control activation to be received some time after the control activation occurred. For time-sensitive application (e.g., such as some video games, etc.), this may prevent wireless controller 109 from being usable with the interactive service. For example, the interactive service may include a video game in which the user controls an avatar jumping across a series of platforms. The control activation may occur when the avatar is at the edge of one such platform. The avatar may fall off the platform before the indication of the control activation is received due to the signal latency induced delay.

Computing device 101 may execute a signal-latency detection processes and/or signal latency mitigation processes configured to adjust the operations of computing device 101 and/or the wireless devices connected to computing device 101 to reduce and/or eliminate the effect of the signal latency.

Figure 2:
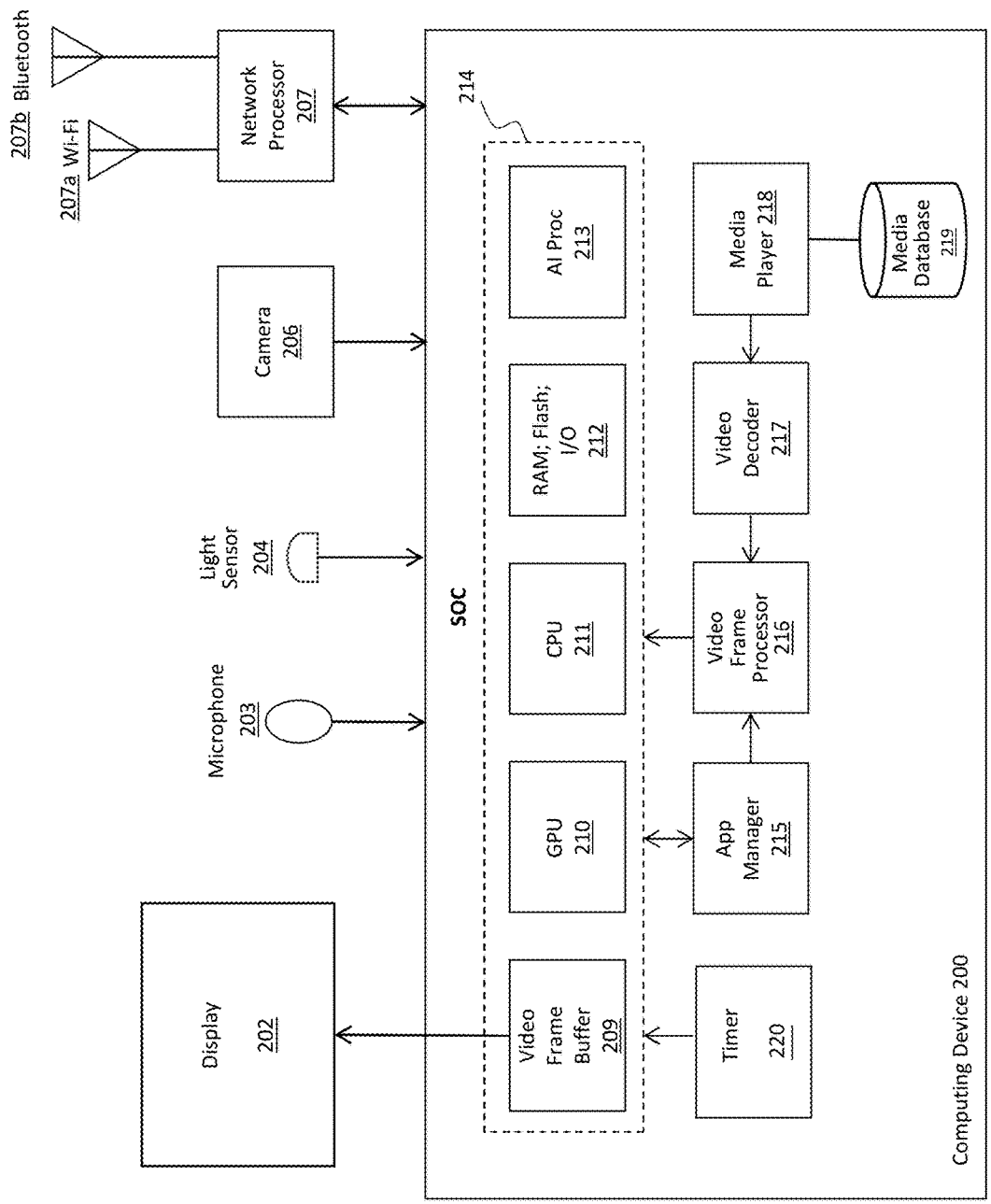
FIG. 2 illustrates a block diagram of an example computing device configured to detect and mitigate signal latency in wireless devices connected to the computing device according to aspects of the present disclosure.

FIG. 2 illustrates a block diagram of an example computing device configured to detect and mitigate signal latency in wireless devices connected to the computing device according to aspects of the present disclosure. Computing device 200 may include one or processing components (e.g., system-on-a-chip, central processing units, application-specific integrated circuits, field programmable gate arrays, and/or the like), memories (e.g., volatile and non-volatile memories, databases, etc.), network processors 207 (e.g., including Wi-Fi 207a, Bluetooth 207b, and/or other transceivers, etc.), and one or more sensors. The sensors may include, but are not limited to, microphone 203, light sensor 204, camera 206, one or more motion-based sensor (e.g., accelerometers, gyroscopes, and/or the like) (not shown). The sensors may be used to detect a response to an output (e.g., for signal latency detection and/or mitigation processes, etc.), detect a state of an environment (e.g., to determine a cause or magnitude of the signal latency, etc.), and/or the like.

Computing device may be configured to present media to one or more users using display 202 and/or one or more wireless devices connective via network processor 207. The video component may be presented via display 202 and/or one or more other displays (e.g., such as other display devices, mobile devices, tablets, and/or the like), while the audio component may be presented via one or more speakers (not shown), one or more wireless devices through network processor 207 (e.g., wireless speakers, headphones, or the like). Computing device 200 may retrieve the media from media database 219 (or alternatively receiving media from one or more broadcast sources, an external device, etc.). The media may be loaded by media player 218, which may process the media based on the container of the video (e.g., MPEG-4, QuickTime Movie, Wavefile Audio File Format, Audio Video Interleave, etc.). Media player 218 may pass the media to video decoder 217, which decodes the video into a sequence of video frames that can be displayed by display 202. The sequence of video frames may be passed to video frame processor 216 in preparation for display. Alternatively, media may be generated by an interactive service operating within app manager 215. App manager 215 may pass the sequence of frames generated by the interactive service to video frame processor 216.

The sequence of video frames may be passed to system-on-a-chip (SOC) 214. SOC 214 may include processing components configured to enable the presentation of the sequence of video components and/or audio components. SOC 214 may include central processing unit (CPU) 211, graphics processing unit (GPU) 210, volatile memories (e.g., random access memory), non-volatile memory (e.g., such as flash, etc.), input/output interfaces (e.g., collectively, the volatile memory, non-volatile memory, and input/output interfaces correspond to block 212), an artificial intelligence processor 213 (e.g., including one or more machine-learning models, training datasets, feature extractors, etc.), and video frame buffer 209.

In examples in which one or more wireless devices are being utilized to present the media, computing device 200 may use network processor 207 to connect to one or more wireless devices (e.g., such as headphone or wireless speakers, etc.), one or more wireless controllers (e.g., video game controllers, etc.), and/or the like. Once connected, computing device 200 may execute one or more detection processes to determine a signal latency associated with the connection with each wireless device. For example, computing device 200 may transmit an output while simultaneously transmitting a data packet. The wireless device may detect the output and start a timer. The timer may be stopped once the corresponding data packet is received. The timer may be indicative of the signal latency of the connection. Alternatively, or additionally, the wireless device may generate an output and simultaneously transmit a data packet. Computing device may initiate a timer using timer 220 when the output is detected. The timer may be terminated when computing device 200 receives the corresponding data packet. The recorded state of the timer may correspond to the signal latency of the connection between computing device 200 and the wireless device. The signal latency may correspond to a time interval delay between when a signal is transmitted and when it is received and/or processed by the recipient device. The detection process may be defined based on the capabilities of computing device 200 and each respective wireless device. In some instances, the detection process may include the use of another wireless device (e.g., such as a device having additional or alternative capabilities, etc.).

The computing device may then execute a mitigation process configured to reduce or eliminate the effect of the signal latency. The mitigation process may be defined based on the detected signal latency, the wireless device, the service being provided by computing device 200 (e.g., such as presentation of audio, video, audio and video, a video game, etc.), and/or the like. In some examples, the mitigation process may synchronize the portion of the media presented by the wireless devices with the portion of the media presented by the computing device 200. The computing device may instantiate video frame buffer 209 configured to store a quantity of video frames from the sequence of video frames. The size of video frame buffer 209 may be based on a quantity may be based on the determined signal latency and a frame rate in which the sequence of video frames is to be displayed. Video frame buffer 209 may be a first-in-first-out (FIFO) buffer in which once full, each time a new vide of frame is stored in video frame buffer 209 the oldest video frame is output to display 202 for display.

Storing frames in video frame buffer 209 causes the video portion of the media being displayed to be delayed by a time interval corresponding to the signal latency. The portion of the media being displayed by the wireless devices may be delayed by approximately a same time interval due to the signal latency delaying the transmission from computing device 200 to the wireless devices. By delaying the video portion of the media being displayed, the video portion may be synchronized with the portion of the media being presented by the wireless devices.

In examples in which the computing device operates an interactive service, a mitigation process may be defined to adjust a timestamp associated with each indication of interaction with the interactive service (e.g., activation of a control of a controller, any interaction with the interactive service, etc.). The computing device may store the state of the interactive service in a buffer (not shown). When an indication of an interaction with the interactive service is received by computing device 200, the computing device determines the state of the interactive service at the time in which the interaction occurred (e.g., the current time minus the signal latency time interval). Computing device 200 may then modify the state of the interactive at the time in which the interaction occurred using the received indication of the interaction. Computing device 200 may also modify each subsequent state up to and including the current state of the interactive service causing the interactive service to be synchronized with wireless devices without being affected by the signal latency of each respective connection with wireless devices.

Figure 3:
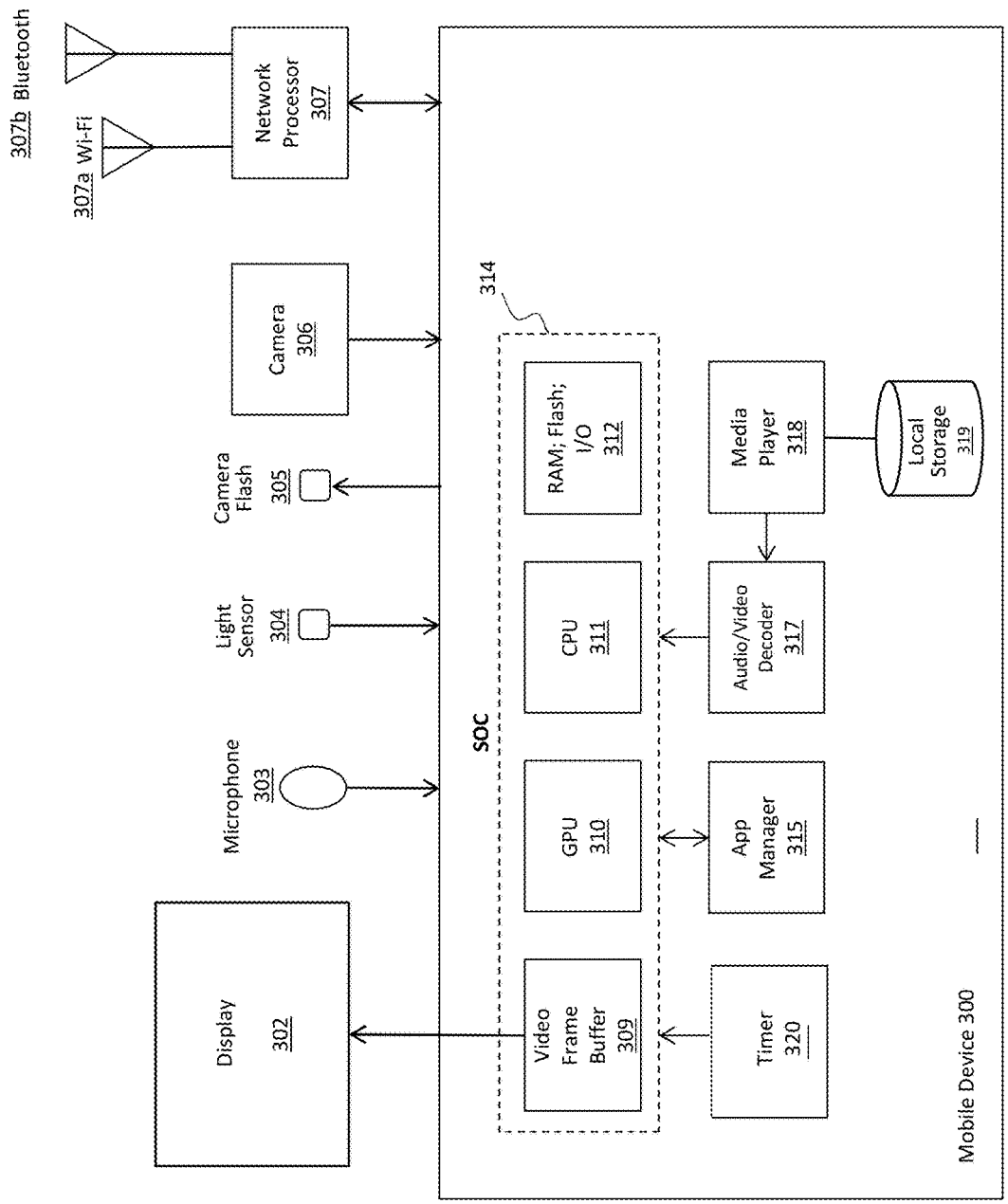
FIG. 3 illustrates a block diagram of an example mobile device configured to detect and mitigate signal latency in wireless devices connected to the computing device according to aspects of the present disclosure.

FIG. 3 illustrates a block diagram of an example mobile device configured to detect and mitigate signal latency in wireless devices connected to the computing device according to aspects of the present disclosure. Mobile device 300 may include one or more components configured to detect and/or mitigate signal latency in connections between mobile device 300 and other devices. The one or more components may provide similar functionality as the components described in connection with computing device 200 of FIG. 2. For example, mobile device 300 may include local storage 319 configured to store media to be presented on display 302 of mobile device 300. Media player 318 may load the media from local storage 319 or receive a media stream from a remote source (e.g., such as broadcast television, a streaming service, etc.). Media player 318 may pass the media to audio/video decoder 317, which may decode the audio component and/or the video component of the media. The audio component and/or video component may be passed to CPU 311 of SOC 314 for presentation. If an interactive service is being presented, then the interactive service executing with app manager 315 may generate the video and/or audio components using GPU 310 and CPU 311.

Mobile device 300 may be configured to determine a signal latency of connections maintained by mobile device 300. Mobile device 300 may establish connections one or more wireless devices using network processor 307 (e.g., via Wi-FI 307a, Bluetooth 307b, and/or other wireless protocols). Once a connection is established with a wireless device, mobile device 300 may use timer 320 to determine the signal latency of the connection using one or more of the detection processes as previously described. For instance, mobile device 300 may use camera flash 305 to generate a flash of light while simultaneously transmitting a data packet to a wireless device (e.g., such as a display device, etc.). The wireless device may detect the flash of light and start a timer. The timer may be stopped once the corresponding data packet is received. The wireless device may transmit the timer value to mobile device 300 and/or the process may be executed in reverse to generate another signal latency. For example, the wireless device may generate an output and transmit a data packet. Mobile device 300 using timer 320 may determine the signal latency corresponds to the time interval between detecting the output and receiving the data packet. The signal latency may be stored in memory for use executing a mitigation process for the connection.

Mobile device 300 may be configured to determine a signal latency for communications between mobile device 300 and other wireless devices. Alternatively, or additionally, mobile device 300 may be configured to approximate the signal latency of a connection between a first device (e.g., such as a display device, computing device, etc.) and a second device (e.g., such as wireless headphone, etc.). Mobile device 300 may connect to the first device and execute a detection process. Mobile device 300 and/or the first device may determine a signal latency value from the detection process. Since the signal latency between the first device and mobile device 300 may be approximately the same. The first device may determine that the signal latency of the connection between the first device and the second device corresponds to the measured signal latency of the connection between the first device and mobile device 300.

Figure 4:
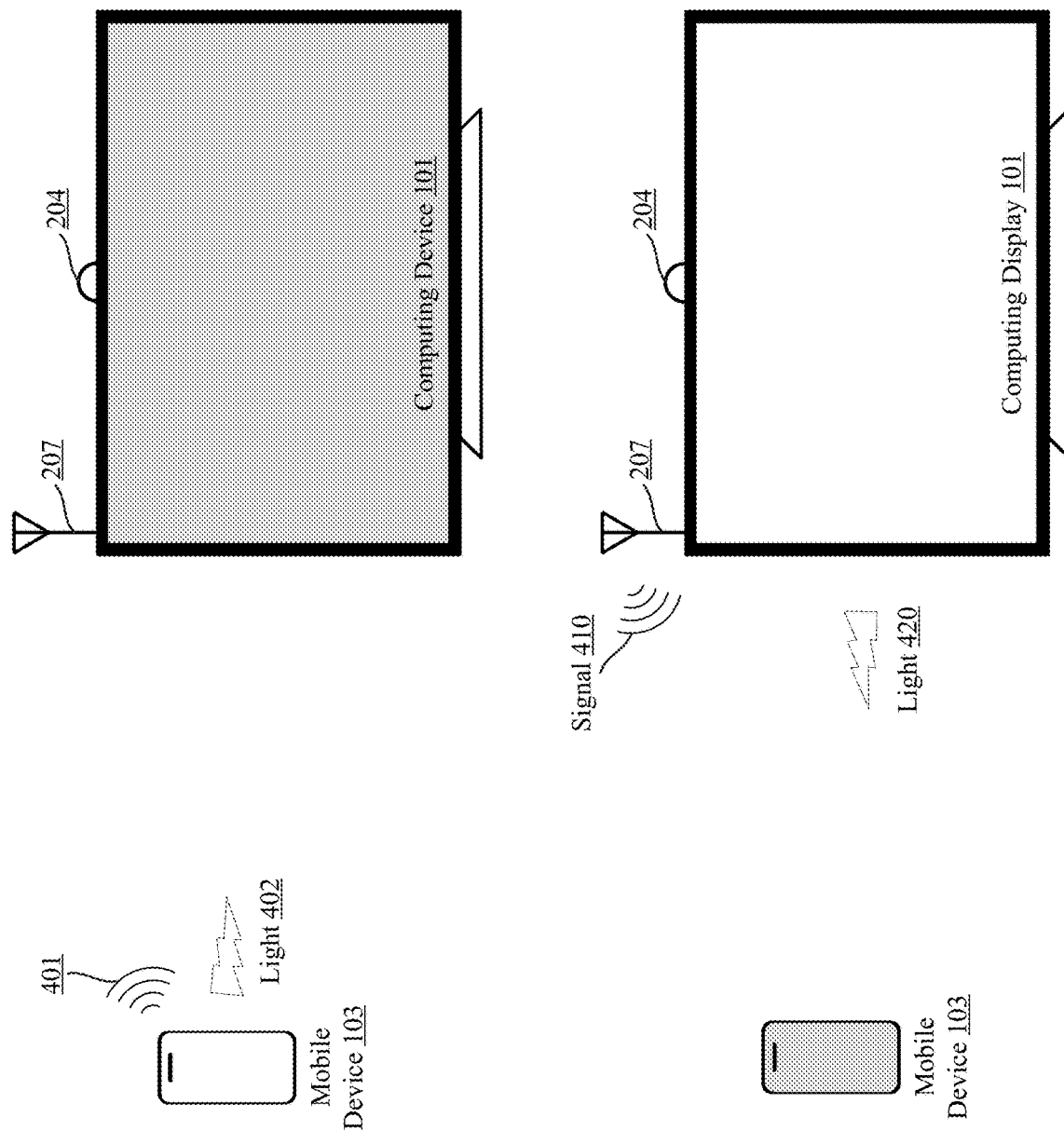
FIG. 4 illustrates an example system for detecting signal latency in a connection between two devices according to aspects of the present disclosure.

FIG. 4 illustrates a block diagram of an example system for detecting signal latency in a connection between two devices according to aspects of the present disclosure. Mobile device 103 may connect to computing device 101 using a wireless communication protocol (e.g., Bluetooth, Wi-Fi, and/or the like). Upon connecting, computing device 101 may execute a detection process to determine the signal latency of the connection with mobile device 103. Mobile device 103 may generate an output (e.g., light 402, audio, video, a symbol, etc.) and transmit a data packet (e.g., signal 401). Computing device 101 may detect the output (e.g., using a microphone for audio, light sensor or camera for light, machine-learning or other object detection algorithm for symbols, etc.) and start a timer. The timer may run until computing device 101 receives the corresponding data packet. The timer value at the time when the data packet is received may correspond to the signal latency of the connection.

Alternatively, or additionally, computing device 101 may execute the detection process by generating an output (e.g., light 402, audio, video, a symbol, etc.) and simultaneously transmitting a data packet (e.g., signal 410). Mobile device 103 may detect the output (e.g., using a microphone for audio, photo detector or camera for light, machine-learning or other object detection algorithm for symbols, etc.) and start a timer. The timer may run until mobile device 103 receives the corresponding data packet. The timer value at the time when the data packet is received may correspond to the signal latency of the connection.

Executing additional detection processes and/or reciprocal detection processes may increase the accuracy of the signal latency detection. In those instances, each device may store the measured signal latency determined by that device. Alternatively, if additional detection processes are executed, each device may store an average, median, mode, and/or other derived from the signal latency that characterizes the connection.

Figure 5:
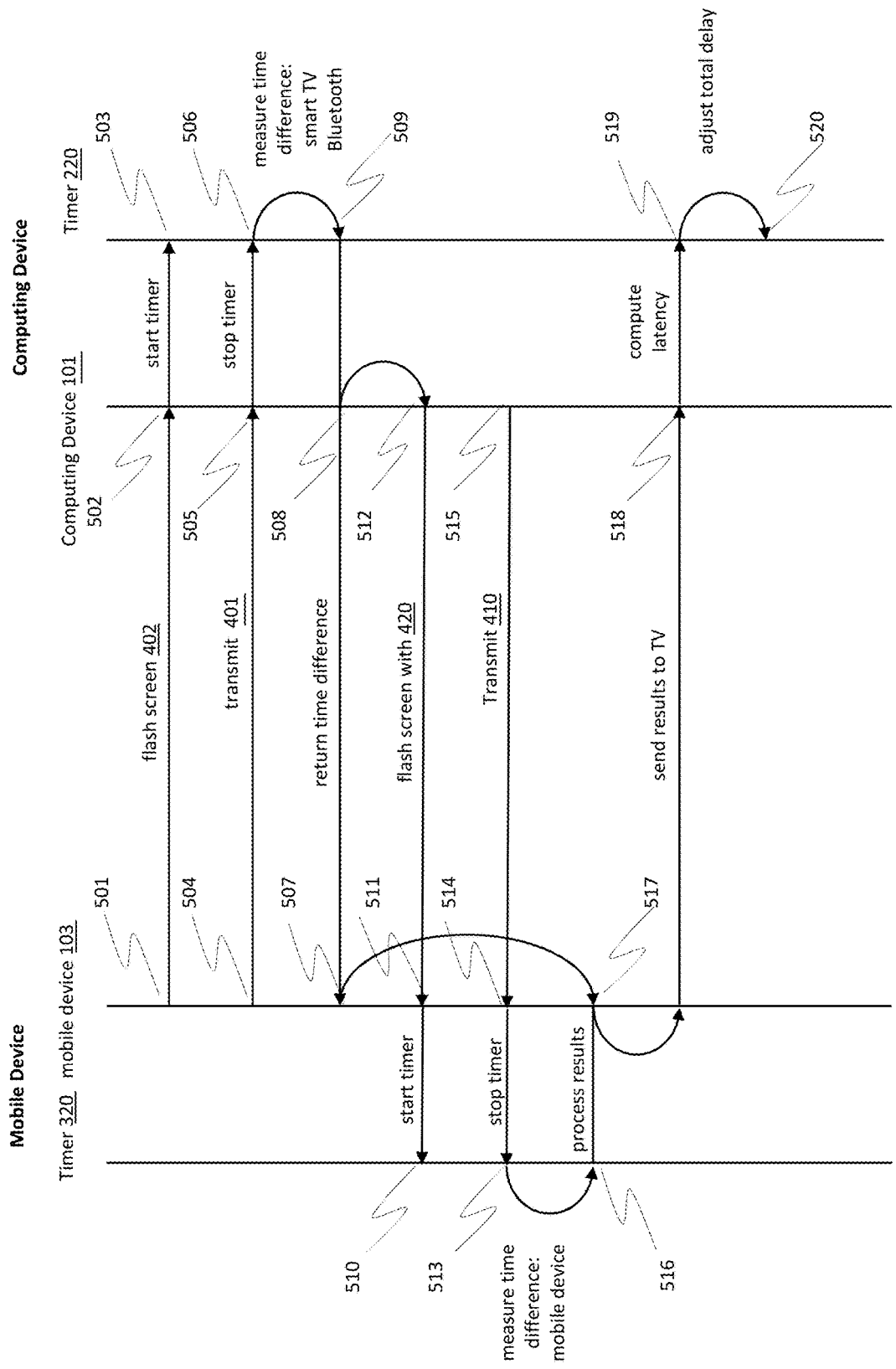
FIG. 5 illustrates a state diagram of an example process for detecting signal latency in a connection between two devices according to aspects of the present disclosure.

FIG. 5 illustrates a state diagram of an example process for detecting signal latency in a connection between two devices according to aspects of the present disclosure. The detection process may be initiated by mobile device 103, computing device 101, or users thereof. The detection process may be initiated upon detecting an event (e.g., such as one device connecting to the other device, etc.), user input, a characteristic of the connection between the mobile device 103 and computing device 101 (e.g., signal quality, quantity or percentage of dropped packets, noise, and/or the like), in regular intervals (e.g., such as every×minutes, etc.), and/or the like. The detection process may begin at 501 when mobile device 103 generates a presentation of light 402 (e.g., displaying a screen including a contiguous set of pixels with an average pixel value of approximately 255, a camera flash, LEDs, and/or the like). Simultaneously, at 504 mobile device 103 may also transmit data packet to computing device 101.

Light 402 may be detected at 502 by computing device 101 causing computing device 101 to initiate timer at 503 using timer 220 of computing device 101. Computing device 101 may receive data packet at 505 and at 506 computing device 101 may stop the timer. The value of the timer corresponds to the time interval between detecting light 402 and receiving data packet (which may also be the time interval over which data packets travel from computing device 101 to mobile device 103). In some instances, at 509, computing device 101 may process the timer value to account for other delays that may be present in the connection (e.g., processing delays, etc.). At 508, computing device 101 may transmit the timer value (or the processed timer value) to mobile device 103, which may be received at 507. Computing device 101 may also store timer value in local memory.

At 512, computing device 101 may initiate a reciprocal detection process (e.g., the same or similar detection process initiated by mobile device 103 at 501, etc.) by generating a presentation of light 420 and simultaneously at 515 transmitting a data packet. The light source may be a camera flash, one or more light emitting diodes, one or more video frames with an average pixel value of approximately 255, etc. Light 420 may be detected at 511 by mobile device 103 causing mobile device 103 to initiate a timer at 510 using timer 320 of mobile device 103. Mobile device 103 may receive data packet at 513 and at 513 mobile device 103 may stop the timer. The value of the timer corresponds to the time interval between detecting light 420 and receiving data packet (which may also be the time interval over which data packets travel from mobile device 103 to computing device 101). In some instances, at 516, mobile device 103 may process the timer value to account for other delays that may affecting the connection (e.g., processing delays, etc.).

Mobile device 103 may also determine if the timer value is accurate (e.g., determining that the timer value is greater than zero, comparing the timer value to the timer value received at 507, comparing the timer value to one or more historical timer values generated from previous detection processes associated with mobile device 103 and computing device 101, using one or more statistical algorithms, and/or the like), and/or the like. For example, if the timer value is greater than a standard deviation from the timer value received at 507, one or more historical timer values, or the like, then the timer value may be discarded, and the detection process may return to 507. At 517, mobile device 103 may transmit the timer value (or the processed timer value) to computing device 101. Mobile device 103 may also store timer value in local memory.

The timer value from mobile device 103 may be received by computing device 101 at 518. At 519, determine a signal latency of the connection between computing device 101 and mobile device 103. The signal latency may correspond to the timer value derived at 509, the timer value derived at 516, and/or an overall timer value derived from the timer value derived at 509 and the timer value derived at 516 (e.g., such as a mean, median, mode, etc. of the two timer values). The signal latency may be used to execute one or more mitigation processes by computing device 101 and/or mobile device 103 such as, but not limited to, delaying a video component to be displayed by computing device 101 to synchronize the video component with an audio component to be presented by mobile device 103 or another wireless device, delaying an audio component that is to be presented by mobile device 103 and/or another wireless device to synchronize the audio component with a video component to be displayed by computing device 101, to synchronize an audio component to be presented by mobile device 103 or another wireless device, modify a service executed by mobile device 103 and/or computing device 101 to cause received interactions to be processed when the interactions occur (rather than when the indication of the interactions are received), etc.

Figure 6:
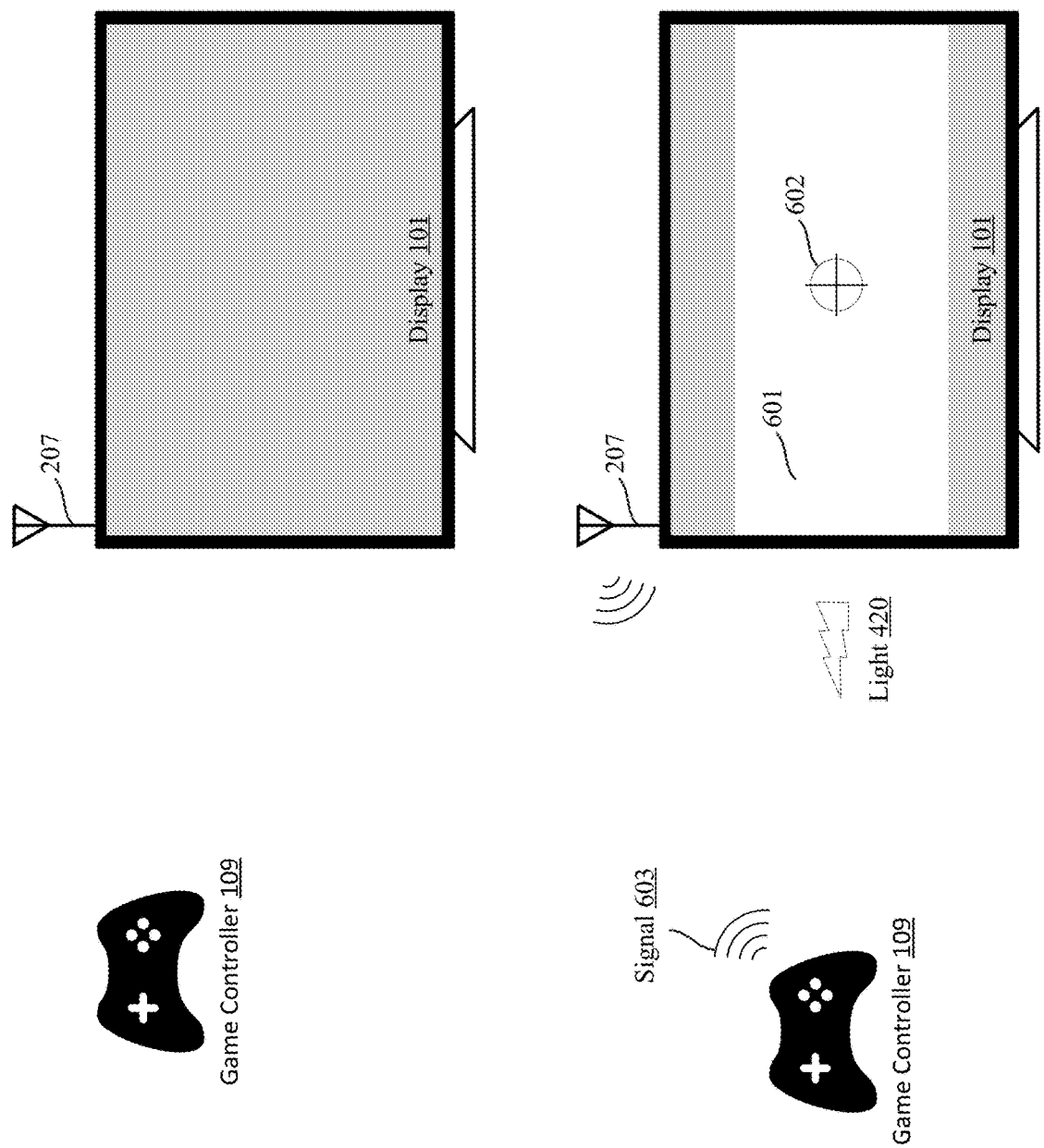
FIG. 6 illustrates an example system for mitigating signal latency in a connection between a controller and a computing device according to aspects of the present disclosure.

FIG. 6 illustrates a block diagram of an example system for mitigating signal latency in a connection between a controller and a computing device according to aspects of the present disclosure. Computing device 101 may use network processor 207 to establish a connection with wireless controller 109. Computing device 101 may include other transceivers configured to connected to other wireless devices using other frequency bands and/or protocols (e.g., Wi-Fi, Zigbee, Z-wave, etc.). Upon connecting, computing device 101 may execute a detection process to determine the signal latency of the connection. In some examples, the detection process may include display visual cue 601 indicating that the detection process is about to begin. Computing device 101 may initiate a timer and simultaneously present visual cue 602 that includes a representation of one or more controls of wireless controller 109 (e.g., such as a symbol of a button, etc.). A user of wireless controller 109 may activate the one or more controls (e.g., press the button corresponding to the representation of the button) causing wireless controller 109 to transmit signal 603 to computing device 101 that indicates the one or more controls have been activated. Computing device 101 may stop the timer upon receiving the signal. The timer value (e.g., the value of the timer upon termination) may correspond to a latency value representing the signal latency of the connection.

In some instances, the latency value (and/or the timer value) may be adjusted to address other sources of latency that may be affecting the connection or operation of wireless controller 109 such as reaction latency or processing latency. Reaction latency may correspond to the time between when the visual cue is presented and when the user activates the corresponding control of wireless controller 109. Processing latency may correspond to the time between when the user activates the control of wireless controller 109 and when wireless controller 109 transmits the data packet with the indication of the control activation.

Computing device 101 may adjust the latency value based on the reaction latency, processing latency, and/or any other source of latency that may have contributed to the latency value such that the adjusted latency value more closely correlates to only the latency of the connection between computing device 101 and wireless controller 109. The impact of reaction latency on the latency value and/or the timer value can be reduced by generating multiple latency values and selecting the latency value that is the smallest. Alternatively, or additionally, the latency value may be reduced by a predetermined quantity (e.g., based on user input, previous executions of detection processes, performance of the service for which the wireless controller 109 is being used, etc.). Processing latency may be reduced by a predetermined quantity based on the processing and/or transmission capabilities of wireless controller 109. For instance, computing device 101 may identify wireless controller 109 and determine the processing components of wireless controller 109. Computing device 101 may then adjust the latency value by a predetermined quantity based on the processing components.

Adjusting the latency value may include increasing the latency value or decreasing the latency value. In some instances, the latency value may only be decreased to reduce the impact of reaction latency and/or processing latency and ensure the latency value represents only the latency of the connection between wireless controller 109 and computing device 101. In other instances, the latency value may be increased or decreased to adjust to improve synchronization between computing device 101 and wireless controller 109 and/or interoperation of computing device 101 and wireless controller 109.

For example, a service operating on computing device 101 may detect input errors (e.g., such as control activations occurring a predetermined time interval before or after an event, etc.) and perform a statistical analysis to determine if the detected input errors are likely the result of user error (e.g., the user activating the control at the wrong time, etc.) or if the detected input errors are likely the result of latency (e.g., signal latency, reaction latency, processing latency, etc.). If the service determines that the if the detected input errors are likely the result of latency. The service may incrementally adjust the latency value to reduce quantity of input errors.

Figure 7:
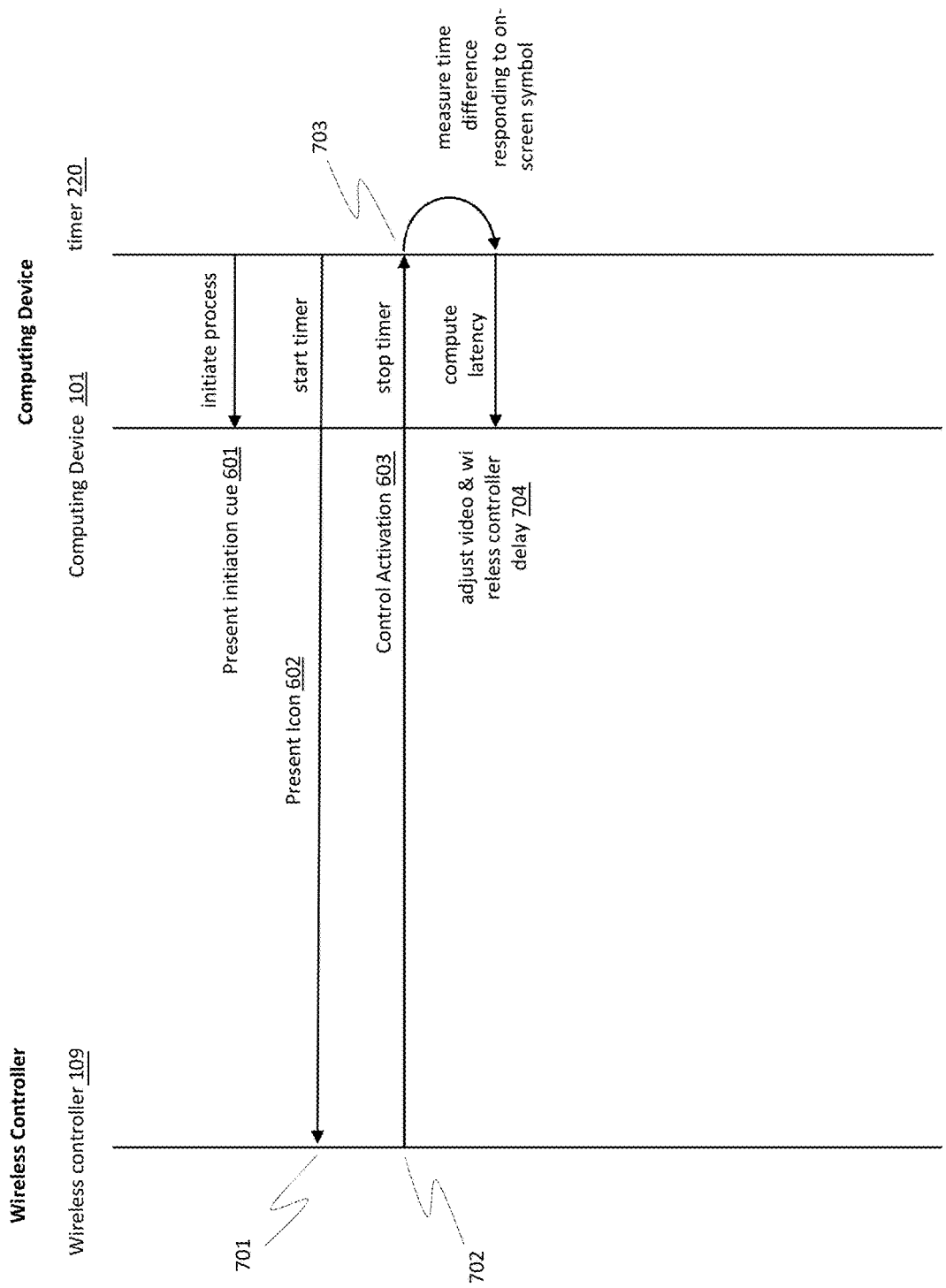
FIG. 7 illustrates a state diagram of example process for detecting signal latency in a connection between a wireless controller and a computing device according to aspects of the present disclosure.

FIG. 7 illustrates a state diagram of example process for detecting signal latency in a connection between a wireless controller and a computing device according to aspects of the present disclosure. Wireless controller 109 may connect to computing device 101 to enable interaction with an interactive service of computing device 101. Once connected, computing device 101 may execute a detection process to determine an approximate signal latency of the connection. Computing device 101 may use the determined signal latency to modify how the interactive service processes input from wireless controller 109. The detection process may be initiated by computing device 101, wireless controller 109, user input, a communication from a remote device, and/or the like.

The detection process may begin when computing device 101 presents visual cue 601 through a display of computing device 101. Visual cue 601 may indicate to a user that the detection process has been initiated and that a subsequent visual cue (e.g., visual cue 602) will be displayed soon. At 701, computing device 101 may present visual cue 602 (including a symbol that represents one or more controls of wireless controller 109) and simultaneously initiate a timer using timer 220. At 702, a control of wireless device 109 may be activated (e.g., via user input, etc.) corresponding to the symbol. Wireless controller 109 may transmit signal 603 including an indication of the control activation over the connection with computing device 101.

At 703, computing device 101 may define a latency value corresponding to value of the timer when the communication is received. The latency value may correspond to the signal latency of the connection (e.g., the time interval over which information is transmitted from wireless controller 109 and is received by computing device 101. In some instances, computing device 101 may modify the latency value based one or more other sources of latency that may impact the time between presenting the visual cue and receiving a corresponding communication. For example, computing device 101 may adjust the latency value based on reaction latency, processing latency, and/or the like as previously described.

At 704, a mitigation process may execute to modify computing device 101, a service of computing device 101, and/or wireless controller 109 to reduce and/or eliminate the effect of the signal latency. The mitigation process may adjust the presentation of a video component, adjust the presentation of an audio component, and/or adjust the input processing of the interactive service. For example, the mitigation process may adjust how input from wireless controller 109 is processed by computing device 101 and/or the service thereof. When computing device 101 receives an indication that a control has been activated, computing device may process the activation according to the time in which the control was activated (e.g., the time instant in which a user presses a button, moves a joystick to a new position, etc.) rather than the time instant in which the indication is received (e.g., due to the signal latency).

In some instances, computing device 101 may perform multiple mitigation processes. For example, in addition to adjusting the input processing, computing device 101 may adjust the presentation of the video component to synchronize the video component with a portion of the audio component presented by wireless controller 109 and/or other wireless devices. The video component can be adjusted by delaying the presentation of the video component to allow for the transmission time of the audio component (or a portion thereof) from the computing device 101 to wireless controller 109. By the time the audio component is received by wireless device 109, the audio component will correspond to the video component being presented by computing device 101.

Figure 8:
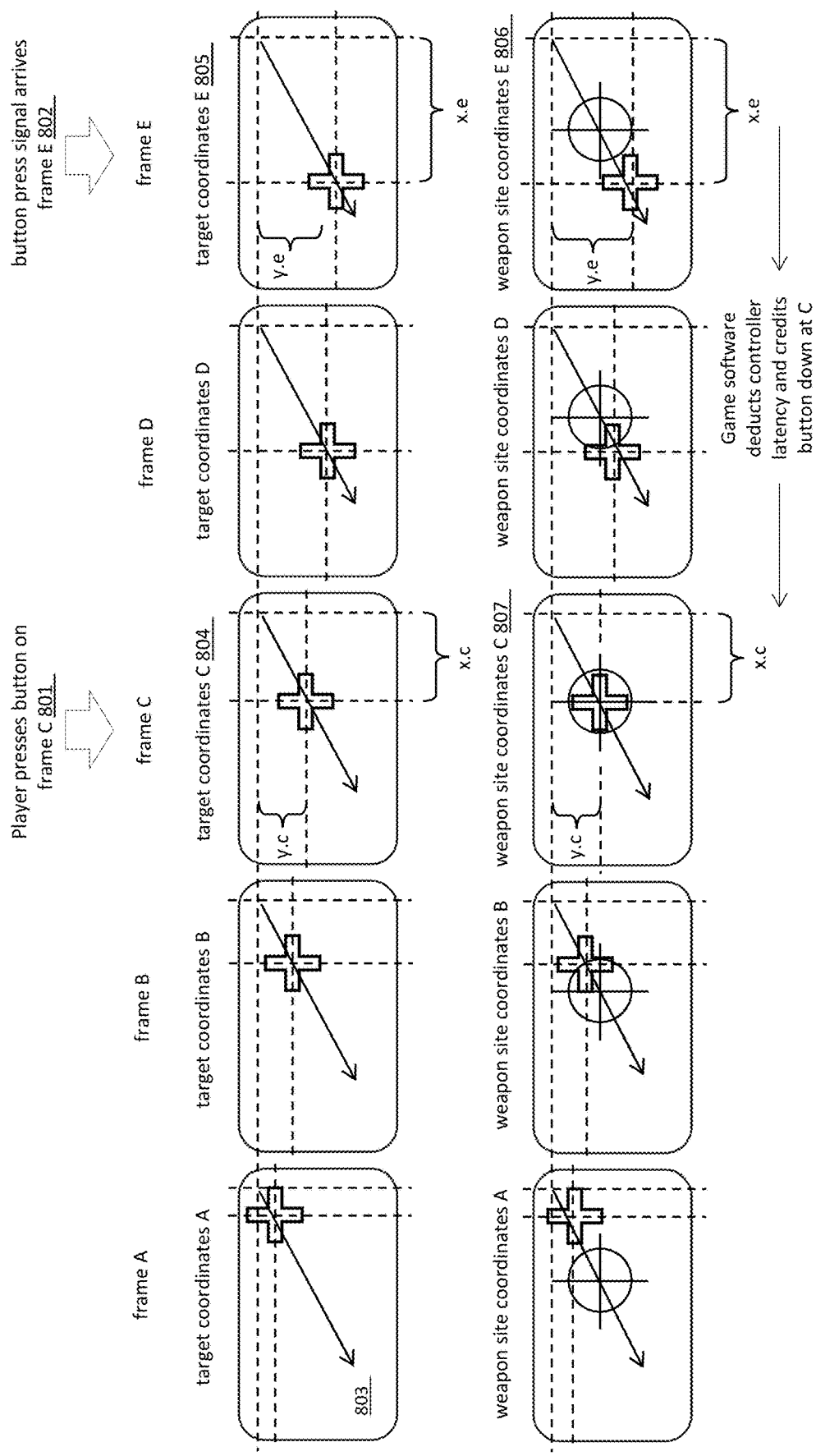
FIG. 8 illustrates example video frames depicting the processing of control activations received from a wireless controller according to aspects of the present disclosure.

FIG. 8 illustrates example video frames depicting the processing of control activations received from a wireless controller according to aspects of the present disclosure. A computing device may operate an interactive service (e.g., such as a video game, etc.), in which a user operating a wireless controller interacts with the interactive service. The interactive service may present a sequence of video frames (e.g., video frames A-E, etc.) based on input received from the wireless controller. At 801 (e.g., Frame C), a control activation may occur to cause a particular action within the interactive service such as causing a character within the interactive service to perform an action, etc. The input from the wireless controller may be received at or just before the presentation of Frame E at 802 due to the signal latency of the connection between the wireless controller and the computing device. At 802, the computing device processes the input according to the current state of the interactive service at 802 rather than the state of the interactive service at 801 when the control activation occurred. Since the control activation is processed later than expected, the corresponding particular action may not be executed as intended.

The mitigation process may adjust how control activations are processed by the interactive service. For example, the interactive service may include a character controlled by the wireless controller positioned within a two or three-dimensional virtual environment. The wireless controller may include one or more joysticks that can be operated to cause the character to aim at particular coordinates within the virtual environment. Frame A includes a representation of the virtual environment in which a target (e.g., represented by the cross symbol moving in the direction indicated by the arrow) is positioned at coordinates A and moving to position 803. The user may operate a joystick to cause the character to begin aiming (starting at weapon site coordinates A). At frame B, the target is positioned at a new location along the trajectory indicated by position 803 and the reticle is positioned closer towards the target as the user manipulates the joystick (e.g., as shown by target coordinates B and weapon site coordinates B, etc.).

At 804, a control activation occurs when the reticle is positioned over the target to, for example, cause the character to shoot the target. Since the indication of the control activation is not yet received (due to the signal latency), the action intended to be executed by the control activation does not occur. Instead, the target continues to a new positioned along the trajectory in the subsequent frame (e.g., as shown by target coordinates D and weapon site coordinates D, etc.). At 805 and 806 in Frame E, when the indication of the control activation is received, the reticle is no longer over the target causing the interactive service to determine that the character missed the target.

The mitigation process tracks the coordinates of targets within the environment of the interactive service. At 805, the target coordinates may be represented as (x.c,y.c) in a two-dimensional environment and (x.c,y.c.,z.c) in a three-dimensional environment. The coordinates indicate a starting position (e.g., x,y or x,y,z) and an offset, c, that corresponds to the change in each dimension from the starting location, where c may have a different value in each dimension. When a control activation is received at Frame E, the mitigation process identifies the current coordinates of the target and the current coordinates of the weapon site coordinates. The mitigation process then identifies the coordinates of the target and the weapon site at the approximate time in which the control activation occurred (e.g., x.c,y.c). For example, the mitigation process may determine the coordinates of the target at time T-L, where L corresponds to the signal latency of the connection between the computing device and the wireless controller. If the weapon site coordinates are approximately equal to the target coordinates at T-L (as shown in Frame see at 807), then the mitigation process causes the interactive service to record a hit rather than a miss.

In some instances, the mitigation process may modify the coordinates of targets after the control activation is processed in response to a detected hit. For example, if the control activation that occurred during Frame C caused a hit that destroyed the target, then the coordinates of the target (or the remains thereof) would be different in the subsequent frames. The mitigation process may modify the stored coordinates of the target that correspond to Frames C (when the control activation occurred) through the current time. By tracking the coordinates of targets (and/or other objects, characters, etc.) within the environment and by modifying coordinates subsequent to a chronologically-corrected event (e.g. a hit recorded at 801 rather than 802), the interactive service may define a state of the interactive service that can be accurately recreated according to any time.

Figure 9:
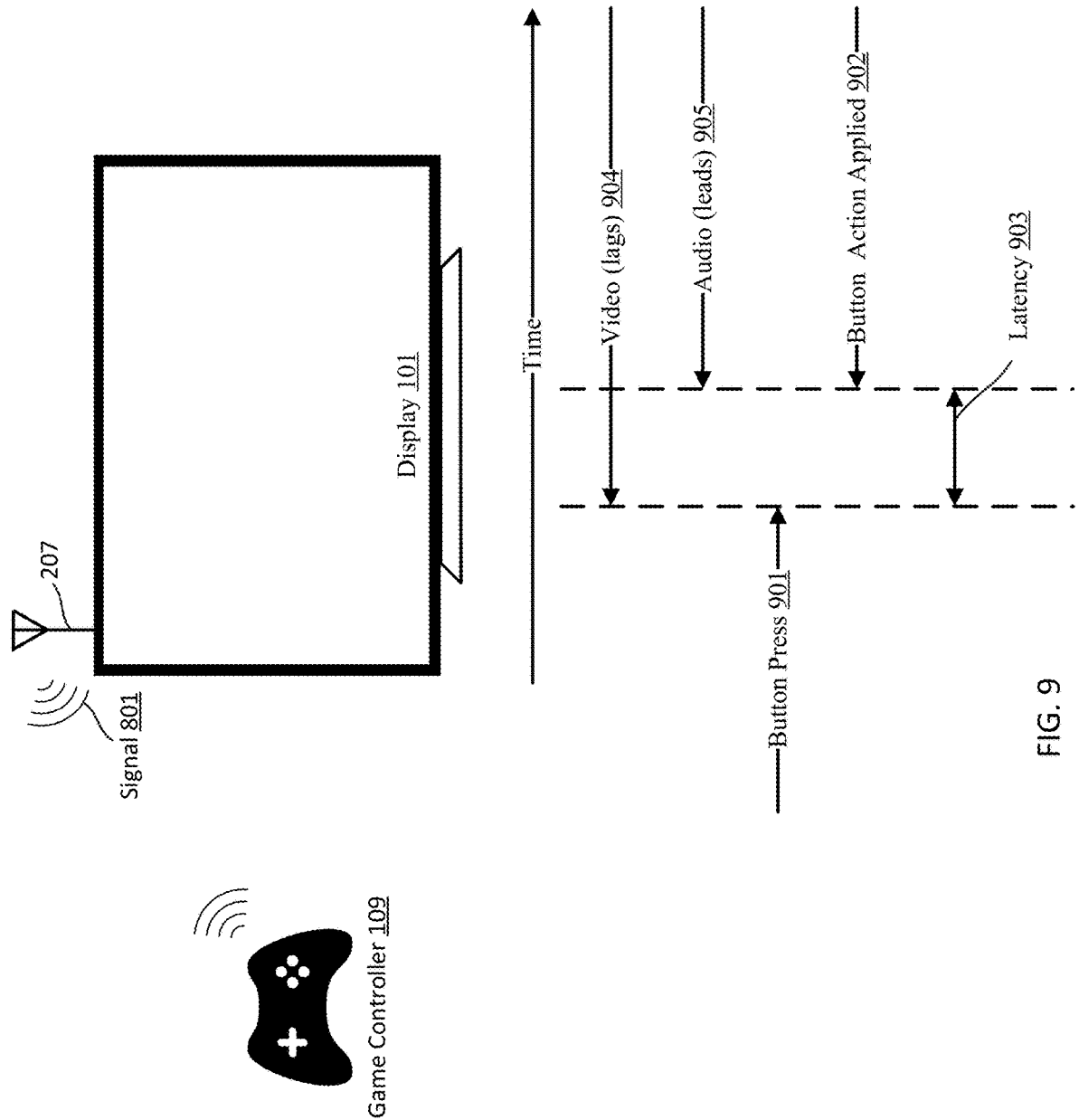
FIG. 9 illustrates an example system for mitigating signal latency in a connection between a wireless controller and a computing device according to aspects of the present disclosure.

FIG. 9 illustrates a block diagram of an example system for mitigating signal latency in a connection between a wireless controller and a computing device according to aspects of the present disclosure. Wireless controller 109 may connect to computing device 101 via a wireless communication protocol (e.g., such as, but not limited to, Wi-Fi, Bluetooth, and/or the like). Wireless controller 109 may be configured enable interaction with an interactive service executing by computing device 101. Signal latency caused by the time interval between transmitting data by wireless controller 109 and receiving data by computing device 101 may cause the intended interactions to be delayed, which may affect the operations of the interactive service. For example, a control activation (e.g., such as a button press, a change in the in a position of a joystick, etc.) may occur at 1101 in order to execute an action associated with a target moving within a virtual environment of the interactive service. Due to the signal latency, the interactive service may not receive the indication of the control activation until 1102, at which point the position of the target within the virtual environment and/or relative to the point of view presented by computing device 101 may have changed.

Wireless controller 109 and/or computing device 101 may compensate for the signal latency by executing a mitigation process configured to adjust the operation of computing device 101, the interactive service, and/or wireless controller 109. Wireless controller 109 and/or computing device 101 may determine a signal latency value 903, L of the connection between wireless controller 109 and computing device 101. A control activation may occur at time T (e.g., Button Press 901, etc.), but may be received by computing device 101 at time T+L (e.g., Button action applied 902, etc.). Upon receiving the indication of the button activation 902, the interactive service may record the control activation at time (T+L)-L. The mitigation process may be executed each time a control activation is received from wireless controller 109 to synchronize the operation of wireless controller 109 with the interactive service of computing device 101.

In some instances, computing device 101 may maintain connections with multiple wireless devices such as wireless controller 109, one or more other wireless controllers, wireless headphones 108, wireless speakers, streaming devices, gaming devices, interactive services, and/or the like that may be affected by signal latency in various ways. For example, the interactive service may include an audio component and a video component that may be presented by computing device 101. Computing device 101 may establish a connection with wireless headphones to present the audio component while computing device 101 may continue to present the video component. Alternatively, or additionally, the audio component may be presented by a wireless speaker or by a speaker included with wireless controller 109, etc. Computing device 101 may transmit the audio component to the wireless device while simultaneously presented the corresponding video component. The signal latency of the connection may prevent the audio component to be received and presented at some time after the corresponding video component. As a result, the audio component and the video component may not be synchronized.

The wireless headphones and/or computing device 101 may compensate for the signal latency by executing a mitigation process configured to adjust the operations of computing device 101 and/or the wireless headphones. The wireless headphones and/or computing device 101 may determine a signal latency of the connection between the wireless headphones and computing device 101. A mitigation process may then be executed to cause the audio and video to maintain synchronization despite the signal latency. The mitigation process may include delaying the presentation of video by a time interval based on the signal latency. For example, computing device 101 may display the video component and simultaneously transmit the audio component that corresponds to that video component to the wireless headphones. Upon executing the mitigation process, computing device 101 may delay the video component such that the video component 904 may lag behind the audio component 905. Computing device 101 may present video component 904 while transmitting the audio component 705. The display of the video component may be delayed providing time for the transmission of the audio component to be received by wireless headphone 108 causing the video component and the audio component to be synchronized.

FIG. 10 illustrates example state data tables that store state information associated with objects of an interactive service for mitigating signal latency in a connection between a wireless controller and a computing device of the interactive service according to aspects of the present disclosure. The interactive service may generate and store a state of the interactive service to enable retroactive processing input from the wireless controller, recreating previous states (e.g., for saving and/or loading a game, etc.), and/or the like. The states of the interactive service may include information associated with each interactive object of the interactive service. For example, the interactive service may include a first set of objects that may be immutable (e.g., does not change based on input received by the wireless controller, etc.) and a second set of objects that may change based on interactions received from the wireless controller (e.g., perform actions, change positions or movement patterns, be removed, etc.).

The interactive service may generate a state of each object of the first set of objects and the second set of objects in one or more state tables that can include one or more of, but is not limited to, an identification of the object, a size and/or shape of the object, a coordinates of the object with the virtual environment, a field of view of the object indicative of a portion of the virtual environment that the object can detect or "see", a quantity of "hit points" or health of the object, an inventory of the object, coordinates in which the object is aiming or weapon or the like, an indication that the object corresponds to the first set of objects or the second set of objects, relationship to one or more other objects, etc.). The information included in the state of each object may be based on whether the object is member of the first set of objects or the second set of objects and an object type (e.g., such as the character being operated by the wireless controller, a non-player-controlled character, a remote user character, a movable object, a static object, etc.).

In some instances, the state of the interactive service may be based on one or more previous sates of the interactive service. A state table storing the state of the interactive service may be an expandable data structure configured to store up to the state of each object of the interactive service, characteristics of the interactive service, characteristics of the virtual environment of the interactive service, etc. A new state table may be generated in regular intervals or each time a single entry in the previous state table changes. For example, if the positional coordinates of a single object within the virtual environment change, then a new state table may be generated to reflect that change. In some instances, each state table may be limited to only those objects that have changed since the previous state was generated to reduce the storage size of each state table. Returning to the previous example, the new state table may include a single entry corresponding to only the single object. In order to recreate a state, the interactive service may need to start at state being created and each subsequent state until the state of each object is identified.

In other instances, the computing device may store the state of the first set of objects (since those objects are immutable subject to less frequent changes) separately from the second set of objects. For example, the states of the first set of objects may be stored in a first state table that may also store other characteristics of the interactive service (e.g., characteristics of the virtual environment, the game corresponding to the interactive service, etc.). The states of the second set of objects may be stored in a second state table in a FIFO buffer. The interactive service may generate a new second state table in regular intervals according to a predetermined tick rate (e.g., corresponding to the time interval between generating new state tables). A higher tick rate may increase the quantity of new state tables generated and enable finer control for processing input from the interactive controller against previous states. A lower tick rate may reduce the size of the FIFO buffer and increase the speed with which new input can be processed (e.g., fewer state table to search for when processing input from the wireless controller).

The FIFO buffer may be instantiated to a size that is based on a storage size of each state, the tick rate, the signal latency value, and/or the like such that the FIFO buffer may store the quantity of states generated by the interactive service over the time interval that is the signal latency value. Once the FIFO buffer is full, each time a new state is added to the FIFO buffer, the oldest state may be removed (e.g., deleted, etc.).

FIG. 10 includes uncompensated target table 1001 (e.g., a first state table) that may store object information of objects based on the time in which interactions are received by the interactive service. At frame A, the object is positioned at an x,y coordinate of 99.57,12.54, the weapon (controlled by a wireless controller operated by a user) is aimed at a position of 71.55,16.79, no detected control activation (e.g., button is 0), and there is no recorded hit (e.g., hit is zero). At frame C, the target coordinates (89.75,16.79) are approximately equal to the weapon coordinates such that, if an indication of a control activation is received, the interactive service would determine that the weapon hit the target. At 1003, the user may activate a control of the wireless controller, but due to the signal latency, the control activation may not be detected until some time after frame C.

Latency compensated target table 1002 (e.g., a second state table) may store object information of objects based on when control activations occur (e.g., latency compensated). The interactive service may execute a detection process to determine signal latency value 903 of the connection between the wireless controller and the interactive service. The signal latency be used to determine a quantity of frames between when a control activation occurs and when an indication of that control activation is received by the interactive service. As shown, the interactive service receives an indication of a control activation 2 frames after the control activation occurred. The interactive service at

1005 may subtract two frames each time an indication of a control activation is received to determine the state of the object at the time in which the control activation occurred.

For example, the indication of the control activation 1003 may be received at 1004, during frame E two frames after the control activation occurred. The interactive service may record the control activation by setting Button to 1. At frame E, the interactive service determines that the weapon coordinates are not equal to the target coordinates. In an uncompensated configuration (e.g., according to table 1001), the interactive service would determine that the weapon missed the target. Table 1002 compensates for the signal latency by subtracting two frames (at 1005) to determine the state of the object and weapon when the control activation actually occurred (e.g., at frame C). Since the target coordinates and the weapon coordinates are approximately equal at frame C, the interactive service records a hit (at 1006). The control activation and/or hit may be recorded when the indication of the control activation is received (e.g., at frame E as shown).

Alternatively, or additionally the control activation and/or hit may be recorded in association with the frame in which the control activation actually occurred (e.g., frame C). The effect of the control activation (e.g., the weapon firing and hitting the target) may alter subsequent movement of the target. For example, the target may be destroyed or may alter course to a different location within the virtual environment. The interactive service may determine the effect of the control activation according to the actual time in which the control activation occurred (e.g., at frame C) and modify the subsequent frames accordingly. For example, if the target was destroyed from the hit recorded during frame C, then the target coordinates may be set to 0,0 or null for frame D and frame E. If the interactive service determines that the hit recorded during frame C would have altered the location of the object in subsequent frames, then the interactive service may replace the target X and target Y values for frame D and frame E based on what the x and y coordinates of the object would have been if the hit was properly recorded during frame C. Retroactively updating one or more states of the interactive service may improve the accuracy of processing interactions with the interactive service. In addition, updating the one or more states may enable accurate recreations of each frame of the interactive service. In some instances, retroactively updating states of the interactive service may cause visual and/or auditory artifacts (e.g., such as when the location of a target is retroactively updated, etc.).

Figure 11A:
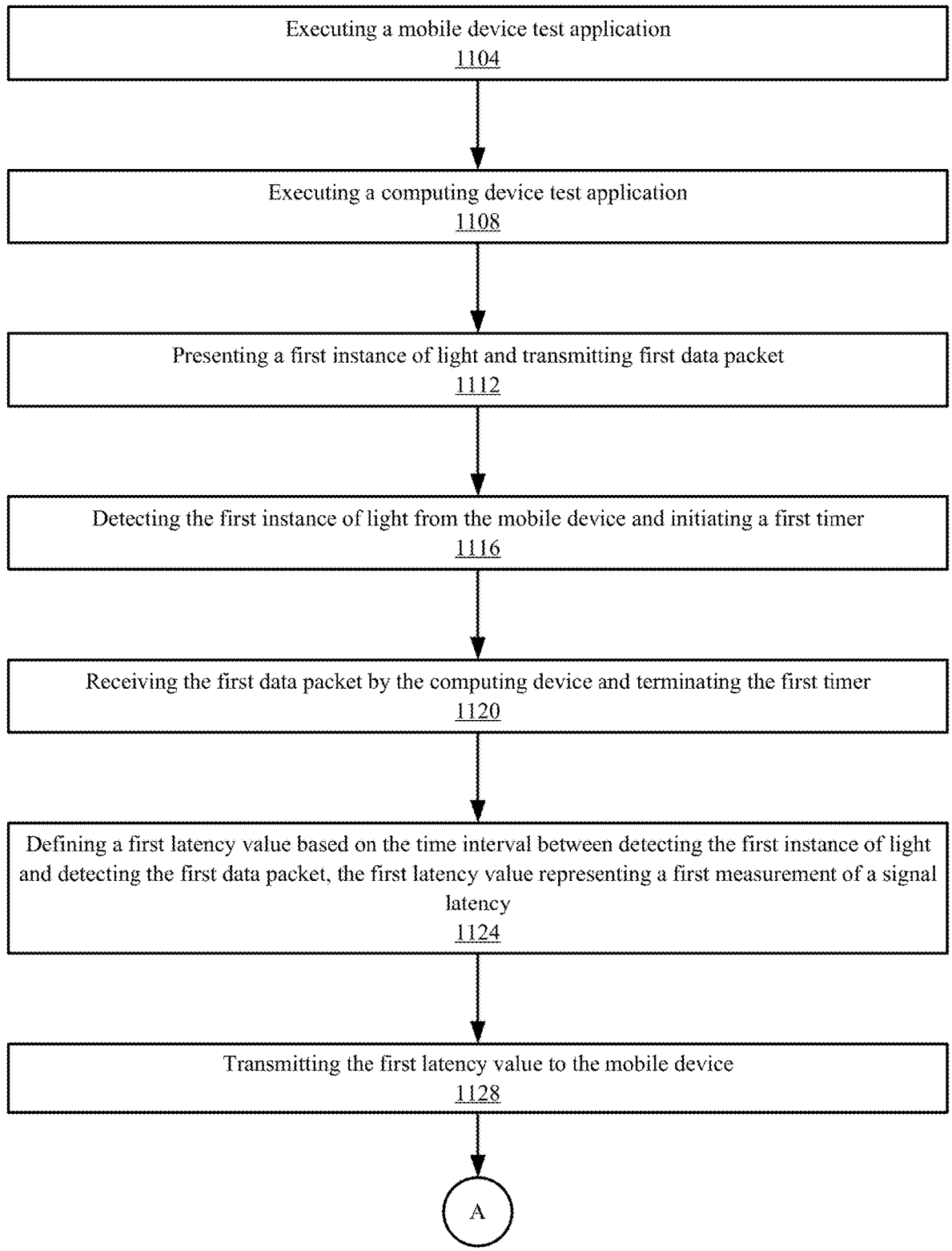
FIGS. 11A and 11B illustrate a flowchart of an example process for mitigating signal latency in connections between wireless devices according to aspects of the present disclosure
Figure 11B:
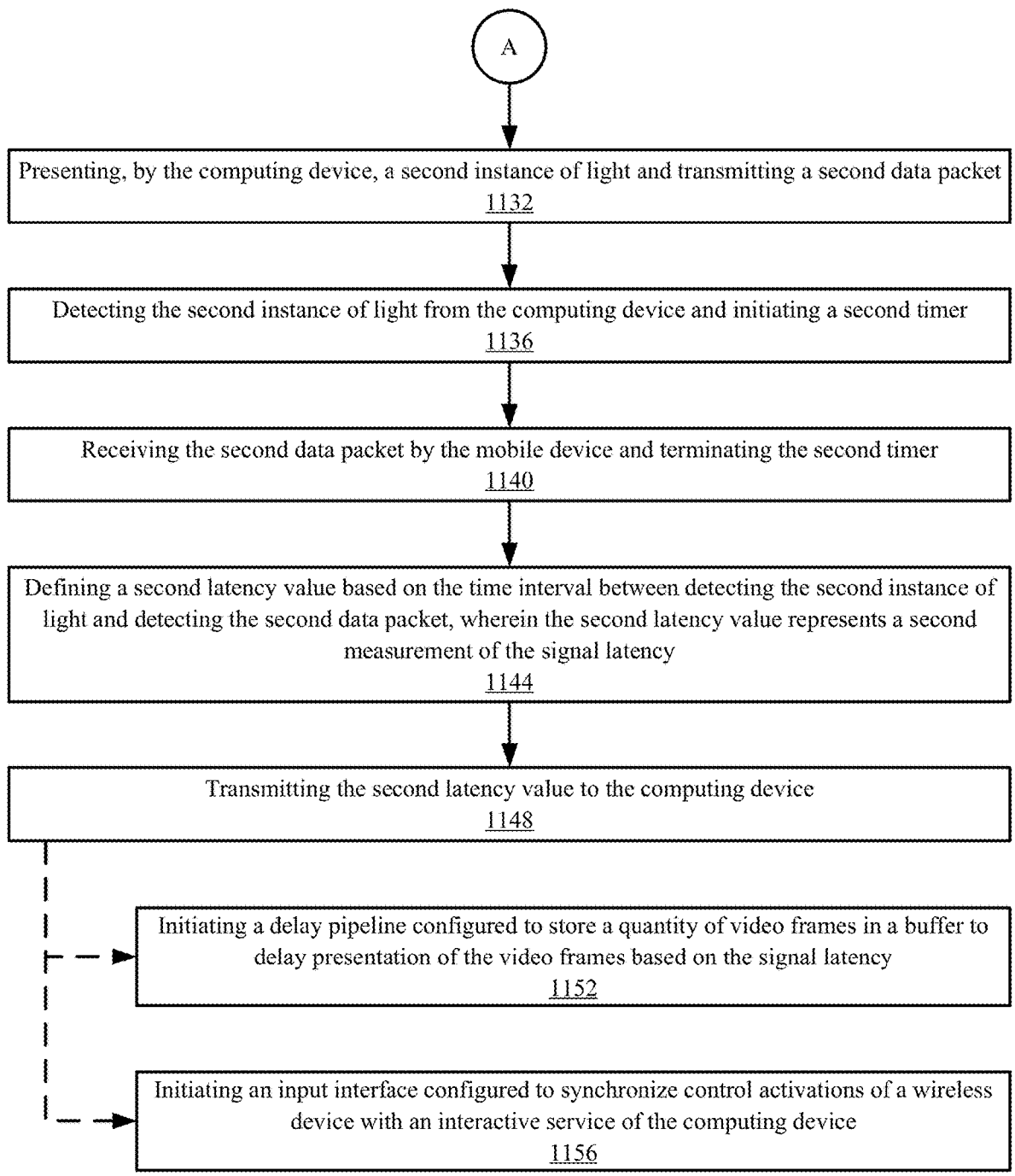

FIGS. 11A and 11B illustrate a flowchart of an example process for measuring and mitigating signal latency in connections between wireless devices according to aspects of the present disclosure. A computing device executing an interactive service may establish connections with one or more wireless devices to facilitate operations of the interactive service such as, but not limited to, presenting a video component (or a portion thereof) of the interactive service, presenting an audio component (or a portion thereof) of the interactive service, receiving input from a user, or the like. Signal latency may impact an ability for the computing device and/or the one or more wireless devices to execute time-sensitive operations such as operations that are intended to be synchronized between a wireless device and the computing device. The computing device and/or the one or more other wireless devices may measure the signal latency and if needed execute one or more mitigation processes configured to reduce the impact of the measured signal latency on the operations of the computing device and/or one or more wireless devices.

The example process may begin with block 1104 in which a mobile device may execute a test application configured to measure a signal latency of a connection between the mobile device and a computing device. The mobile device may be, but is not limited to, a smartphone, tablet, computing device, etc. The computing device may be, but is not limited to, a personal computer, display device such as a computer monitor or television, video game console, projector, etc.). The computing device and wireless device may be connected over a communication protocol such as, but not limited to, Wi-Fi, Bluetooth, Zigbee, Z-wave, Thread, Wireless M-BUS, or the like.

The mobile device may execute the test application upon establishing the connection to the computing device. The mobile device may also execute the test application one or more additional times while the mobile device (and/or other wireless devices) is connected to the computing device to update the signal latency measurement. For example, the test application may be executed when a connection is first established, based on user input, upon detecting that an operation of the computing is no longer synchronized with the mobile device or other wireless device, in regular intervals, based on characteristics of the connection between the computing device and the mobile device or other wireless device, and/or the like.

At block 1108, the computing device may execute a test application stored in memory of the computing device and configured to measure a signal latency of a connection between the mobile device and the computing device. In some instances, the test application may execute prior to, after, or at the same time as the test application executed by the mobile device. The test application of the computing device may include the same functionality and execute under the same conditions as the test application of the mobile device. In some examples, the computing device and the mobile device may synchronize execution of the respective test applications. In those examples, the mobile device and/or the computing device may transmit data packets indicating when to execute the test applications. Alternatively, or additionally, the mobile device and/or the computing device may use an event handler configured to trigger execution of the test application upon detection of predetermined events.

In some examples, the process may be initiated by the computing device. The computing device may display an image directing a user to execute the test application on the mobile device. Alternatively, the computing device may transmit a data packet to the mobile device causing the mobile device to execute the test application. Alternatively, the mobile device may initiate the process by transmitting a data packet to the computing device causing the computing device to execute the test application. The user may select, which device (e.g., the computing device or the wireless device) is to generate the first measurement. If the computing device is to generate the first measurement, then the computing device may then wait for sensor input from the mobile device. If the mobile device is to generate the first measurement, then the computing device may present a dark image (e.g., pixels having an average pixel value of approximately zero or below a predetermined threshold, etc.).

At block 1112, the mobile device may present a first instance of light and approximately simultaneously transmit a first data packet to the computing device. The first instance of light may be generated by a camera flash, one or more light emitting diodes (LEDs) of the mobile device, presenting via a display of the mobile device pixels with an average pixel value of approximately 255, and/or the like.

In some instances, the first instance of light may include light emitted at a particular wavelength of the electromagnetic spectrum (e.g., blue with a wavelength of 450-485 nanometers, green with a wavelength of 500-565 nanometers, etc.) to improve the accuracy of detecting the first instance of light. For example, the wavelength may be based on an average wavelength of ambient light of the environment of the mobile device or computing device. The wavelength may be select so as to be distinguishable from the average wavelength of the ambient light of the environment. Alternatively, the wavelength may be selected by the device configured to detect the second instance of light (i.e., the mobile device, etc.).

At block 1116, the computing device may detect the first instance of light using an optical sensor. If the first instance of light includes light emitted at particular wavelengths, the optical sensor may be tuned to detect light of those particular wavelengths. The computing device may generate and store a first timestamp corresponding to the time in which the first instance of light is detected. Alternatively, or additionally the computing device may initiate a timer when the first instance of light is detected.

At block 1120, the computing device may receive the first data packet from the mobile device. The data packet may be received at some time after the first instance of light is detected due to the distance over which the data packet traveled from the mobile device to the computing device (i.e., the signal latency). The computing device may generate and store a second timestamp corresponding to the time in which the data packet is received. Alternatively, or additionally, the computing device may terminate the timer and store a timer value corresponding to the time of the timer when the timer terminated.

At block 1124, the computing device may define a first latency value based on the first timestamp and the second timestamp. Alternatively, or additionally, the first latency value may be based on timer value. The first latency value may represent a first measurement of a signal latency of the connection between the mobile device and the computing device.

At block 1128, the computing device may transmit the first signal latency value to the mobile device. The mobile device may use the signal latency to maintain a synchronization with the computing device. For example, the signal latency may be used to execute a mitigation process by the mobile device to synchronize operations of the mobile device with operations of the computing device. In other examples, the signal latency may be used to determine when the detection process is to be re-executed. For instance, a subsequent signal latency value may be received from the computing device and compared with the first signal latency value. If the first signal latency and subsequent signal latency differ by more than a threshold amount, then blocks 1112-1128 may be executed again to generate a new first latency value representing a current signal latency of the connection between the computing device and the mobile device.

FIG. 11B continues the process at block 1132, where a reciprocal detection process may be executed. The computing device may present a second instance of light and simultaneously or near-simultaneously transmit a second data packet to the mobile device. The second instance of light may be presented by a camera flash, one or more light emitting diodes of the mobile device, displaying one or more frames of pixels with an average pixel value of approximately 255, and/or the like.

In some instances, the second instance of light may include light emitted at a particular wavelength of the electromagnetic spectrum (e.g., blue with a wavelength of 450-485 nanometers, green with a wavelength of 500-565 nanometers, etc.) to improve the accuracy of detecting the first instance of light. For example, the wavelength may be based on an average wavelength of ambient light of the environment of the mobile device or computing device. The wavelength may be select so as to be distinguishable from the average wavelength of the ambient light of the environment. Alternatively, the wavelength may be selected by the device configured to detect the second instance of light (i.e., the mobile device, etc.).

At block 1136, the mobile device may detect the second instance of light using an optical sensor. If the second instance of light includes light emitted at particular wavelengths, the optical sensor may be tuned to detect light of those particular wavelengths. The mobile device may generate and store a third timestamp corresponding to the time in which the second instance of light is detected. Alternatively, or additionally the mobile device may initiate a timer when the second instance of light is detected.

At block 1140, the mobile device may receive the data packet from the computing device. The data packet may be received at some time after the flash of light is detected due to the signal latency. The mobile device may generate and store a fourth timestamp corresponding to the time in which the data packet is received. Alternatively, or additionally, the computing device may terminate the timer and store a timer value corresponding to the time of the timer when the timer terminated.

At block 1144, the mobile device may define a second latency value based on the third timestamp and the fourth timestamp. Alternatively, or additionally, the second latency value may be based on the timer value. The second latency value may represent a second measurement of a signal latency of the connection between the mobile device and the computing device.

At block 1148, the mobile device may transmit the second latency value. The computing device may use the second latency value to derive an overall latency value. For example, the overall latency value may correspond to an average of the first latency value and the second latency value. Alternatively, the overall latency value may correspond to a highest latency value selected from among the first latency value and the second latency value. Alternatively, such as when blocks 1112-1148 are executed over multiple iterations to generate multiple first latency values and multiple second latency values, the overall latency value may be derived by a statistical analysis of the multiple first latency values and the multiple second latency values.

In some examples, blocks 1112-1128 may execute in parallel with blocks 1132-1148. For example, the first instance of light may be presented (and the first data packet transmitted) by the mobile device at approximately the same time as the second instance of light is presented (and the second data packet transmitted) by the computing device. The computing device may define the first latency value while the mobile device is defining the second latency value.

In some examples, the computing device may determine whether to execute either blocks 1112-1124 or blocks 1132-1148. In those examples, the computing device may derive a single latency value (e.g., the first latency value if blocks 1112-1124 are selected and the second latency value if blocks 1132-1148 are selected). The computing device may use the single latency value rather than two latency values. Alternatively, the computing device may execute either blocks 1112-1124 or blocks 1132-1148 over multiple iterations to derive multiple latency values.

The signal latency of the connection between the computing device and the mobile device may be approximately equal to the signal latency of other connections maintained by the computing device that are using a same communication protocol as the connection between the computing device and the mobile device. The first latency value, the second latency value, and/or the overall latency value may be usable to perform mitigation processes that may improve the operations of the computing device and the mobile device as well as the computing device and other wireless devices connected to the computing device. For example, the mobile device may be usable to derive latency values for other wireless devices that may lack the components to perform one or more of blocks 1112-1148 such as wireless headphones that may lack optical sensors or LEDs. Once the first latency value, the second latency value, and/or the overall latency value is derived, the computing device may execute one or more mitigation processes that may improve the operations of the computing device and the wireless headphones.

At block 1152, a first mitigation process may be executed by the computing device. The first mitigation process may initiate a delay pipeline to synchronize the audio components and the video components. The delay pipeline may include a buffer configured to store video frames from the video component of the media. The buffer may be a FIFO buffer that, once filled, outputs the oldest video frame each time a new video frame is stored in the buffer. The buffer may be instantiated to a size that corresponds to the signal latency, the resolution of the video frames, and the frame rate such that the quantity of video frames stored corresponds to the quantity of video frames that would be displayed over the time interval that is the signal latency. The buffer may cause the video component to be delayed according to the time interval corresponding to the signal latency. By delaying the video component, the corresponding audio component is given time to be received by the mobile device (or other wireless devices) synchronizing the audio component and the video component of the media.

Alternatively, the computing device may advance the audio component based on the time interval of the signal latency. The computing device may present the portion of the video component of the media stream that corresponds to time T. The computing device may transmit the portion of the transmit the audio component that corresponds to time T+L (where L corresponds to the time interval of the signal latency). By the time, the audio component is received by the mobile device (or other wireless devices), the computing device may be presenting the portion of the video component that corresponds to time T+L such that the audio component presented by the mobile device (or other wireless devices) and the video component presented by the computing device are synchronized.

At block 1156, a second mitigation process may be executed for wireless devices configured to interact with the computing device or a service thereof. The computing device may execute an interactive service configured to operate based on input received from one or more wireless devices (e.g., wireless controllers, etc.). Signal latency may cause input from the one or more wireless devices to be processed after the state of the interactive service has changed. For example, a video game interactive service may include a character aiming a weapon at a moving target, a wireless controller may be used to adjust the aim of the weapon and cause the weapon to fire. A control activation of the wireless controller (e.g., a button actuation, joystick adjustment, and/or the like) may occur when the weapon is aimed at the target. By the time the interactive service receives an indication that the control activation occurred, the state of the interactive service may have changed such that the weapon is no longer aimed at the target causing the interactive service to record a miss.

The second mitigation process may initiate an input interface (or modify a current input interface) that processes input from the wireless device. The interactive service may generate a state data structure that corresponds to the state of the interactive service (e.g., the absolute or relative coordinates of objects, targets, characters, etc.; position and/or orientation of the point of view being presented, the coordinate in which a weapon or the like is being aimed, coordinates of a curser or the like, state of an virtual environment of the interactive service, and/or any other characteristic and/or property usable to recreate the state of the interactive service at a particular time). The state data structure may include an identifier (e.g., usable to address the state data structure and/or to order two or more state data structures into a sequence), a timestamp, and/or the like.

The interactive service may be configured to generate a state data structure in regular intervals. The interactive service may store a predetermined quantity of state data structures. In some instances, such as when the interactive service is configured to execute for long periods of time, the interactive service may periodically remove the oldest state data structure to avoid storing too many states in memory. For example, the interactive service may store a quantity of state data structures that were generated over a time interval equal to the signal latency. When a new state data structure is generated, the interactive service may delete the oldest state data structure.

The input interface may receive an indication of a control activation and pass the indication to the interactive service with an identification of a particular state data structure (e.g., by identifier, timestamp, etc.) in which the control activation occurred. The interactive service may then process the control activation by modifying the particular state data structure (and potentially the state data structures generated after the particular state data structure up to a current time) such that the control activation is processed as if it is received when the state of the interactive service corresponded to the particular state data structure.

For example, the input interface may receive an indication of a control activation by the wireless device (e.g., at time T). The input interface may then determine the state of the interactive service when the control activation actually occurred (e.g., when the control was activated at the wireless controller at time T-L). The input interface passes the indication of the control activation and an identification of the state data structure and/or the timestamp corresponding to state of the interactive service when the control activation actually occurred. The interactive service then determines what the state of the interactive service (e.g., based on the corresponding state data structure) would have been if the control activation was processed when the control activation actually occurred. Returning to the example above, the interactive service may determine if at time (T+L)-L, a control activation would cause the weapon to hit the target. If so, then the interactive service processes the input from the wireless controller as if the target was hit.

In some instances, the input may be recorded at the current time T (e.g., the time corresponding to when the indication of the control activation is received), while the effect of the control activation may be determined based on the state of the interactive service at the time in which the control activation actually occurred. In other instances, the input may be recorded at the time in which the control activation actually occurred (e.g., time T−L). In those instances, the second mitigation process may modify the particular state data structure that corresponds to the time in which the control activation actually occurred. The second mitigation process may also modify one or more additional state data structure between the particular state data structure and a state data structure that corresponds to the current time T.

The computing device may execute one or more mitigation processes based on the capabilities of the wireless devices connected to the computing device and/or the services provided by the computing devices. For example, the first mitigation process may be executed for devices configured to present a component of media to be synchronized with other components of the media presented by the computing device. The second mitigation process may be executed for devices configured to interact with an interactive service of the computing device.

Figure 12:
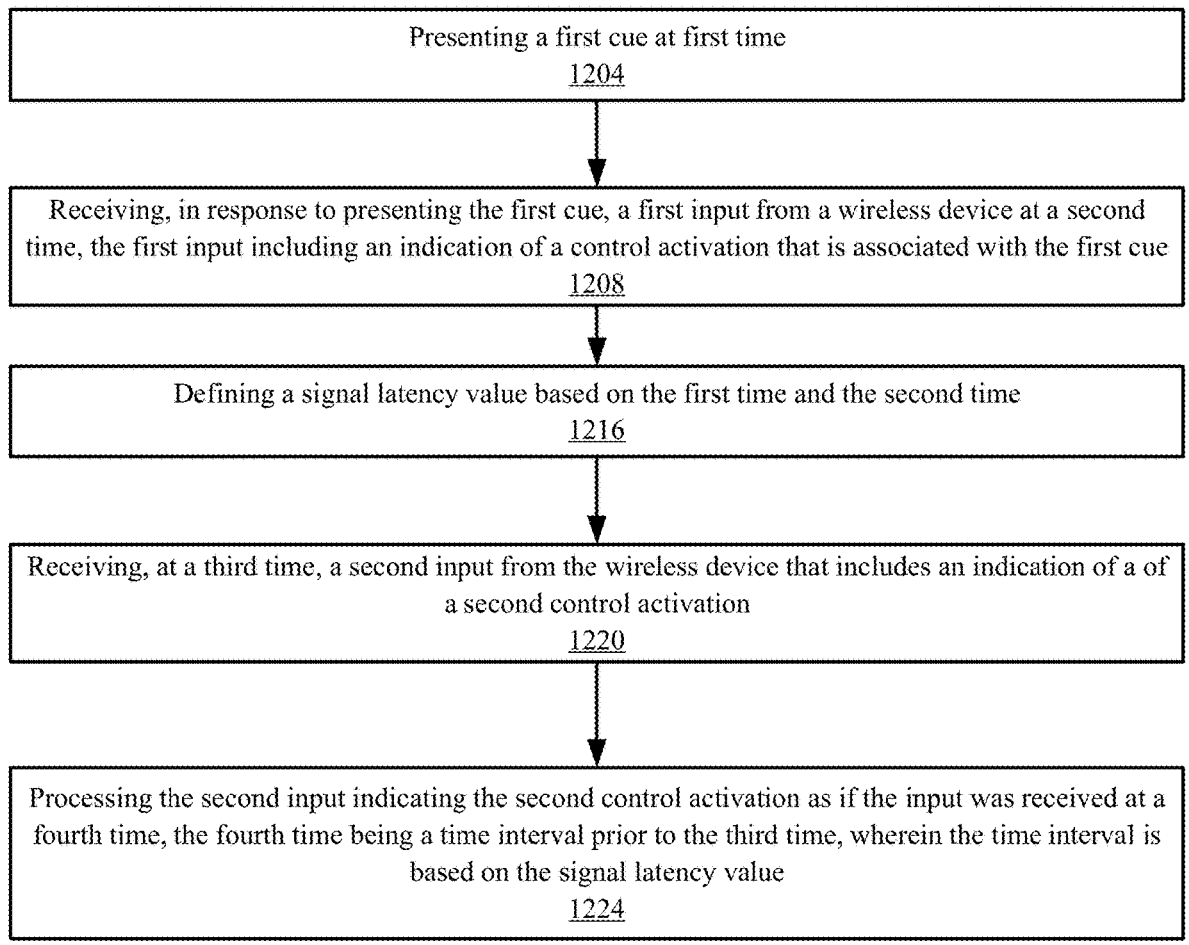
FIG. 12 illustrates a flowchart of an example process for measuring and mitigating signal latency in connections between a wireless controller and a computing device according to aspects of the present disclosure.

FIG. 12 illustrates a flowchart of an example process for measuring and mitigating signal latency in connections between a wireless controller and a computing device according to aspects of the present disclosure. A computing device may execute an interactive service (e.g., video game, etc.) that may be configured to receive input from a wireless controller (e.g., such as a video game controller, remote controller, etc.). Signal latency in the connection between the wireless controller and the interactive service may impact one or more of the operations of the wireless device and/or the interactive service.

The computing device may establish a connection with the wireless controller. The computing device may establish the connection with the wireless controller using a wireless communication protocol such as, but not limited to, Wi-Fi, Bluetooth, Zigbee, Z-wave, Thread, Wireless M-BUS, or the like.

The computing device may establish a connection with the wireless device using a handshaking protocol (e.g., a pairing process or other process involving the transmission of data packets used to establish a connection between two or more devices). Alternatively, the computing device may establish a connection with the wireless device by exchanging communications (e.g., such as data packets, etc.). The connection may be established when the computing device transmits a data packet to the wireless device, when the wireless device transmits a data packet to the computing device, and/or when both the computing device transmits a data packet to the wireless devices and the wireless device transmits a data packet to the wireless device.

The computing device may be configured to receive communications from the wireless controller over the connection indicative of an activation of a control of the wireless controller (e.g., such as a button, joystick, touchscreen, touchpad, etc.). The computing device may also be configured to transmit audio segments and/or video segments to the wireless controller for presentation by the wireless controller.

At block 1204, the computing device may present a first cue at a first time. The first cue may be an audio segment and/or a video segment configured to be detected by the wireless controller or the user thereof. In sone examples, the first cue may include a symbol of a control of the wireless controller that can be activated (e.g., actuated, pressed, manipulated, etc.). In other examples, the first cue may include one or more audio tones (at respective predetermined frequencies), one or more video frames, light (e.g., presented using one or more video frames with an average pixel value of approximately 255, a camera flash, an LED, and/or the like. The first cue may indicate to the wireless device or the user thereof to activate a control of the wireless device associated with the first cue.

The computing device may generate and store a first timestamp (e.g., referred to as a first time) corresponding to the time in which the first cue is presented. Alternatively, or additionally, the computing device may initiate a timer upon presenting the first cue. The timestamp and/or timer may indicate the beginning of a first event usable to determine the signal latency of the connection with the wireless controller.

At block 1208, the computing device may receive, from the wireless controller, a first input including an indication of first control activation of a control of the wireless device. The control may be associated with the first cue. For example, the control activation may correspond to the button identified by the symbol of the first cue.

The computing device may generate and store a second timestamp (e.g., referred to as the second time) corresponding to the time in which the first input is received. Alternatively, or additionally, the computing device may terminate the timer (if such a timer was initiated upon presenting the cue) and store a timer value corresponding to the time of the timer when the timer terminated. The first input may be indicative of a second event usable along with the first event to determine the signal latency At block 1212, the computing device may define a first signal latency value based on the first time and the second time (e.g., the first timestamp and the second timestamp). Alternatively, the computing device may define the first signal latency value based on the timer value. The first signal latency value may correspond to the time interval over which a data packet travels from the wireless controller to the computing device.

In some instances, blocks 1204-1212 may be performed a predetermined quantity of times to derive a corresponding predetermined quantity of first signal latency values. The computing device may then process the predetermined quantity of first signal latency values to derive an overall signal latency value (e.g., using one or more statistical algorithms, an average, a media, a mode, etc.). Generating additional first signal latency values may prevent a single outlier measurement from biasing the determination of the signal latency.

At block 1216, the computing device may receive a second input including an indication of a second control activation. The second input may be received at a third time (e.g., at some time after the second time). The control activation may include any activation of one or more controls of the wireless controller. For example, the control activation may correspond to one or more button actuations, an indication that a position of a joystick has changed from an initial position to a current position, an indication of a touch input, etc.

At block 1220, the computing device may process the second input as if the input was received at a fourth time that is prior to the third time. The time interval between the third time and the fourth time may be equal to the signal latency value. In other words, the computing device processes the second input as if the second input is received when the control activation occurred (e.g., at the third time) rather than when the indication of the control activation is received by the computing device (e.g., at the fourth time).

The computing device may process the second input by manipulating state data of the interactive service. The interactive service may define a state data structure that corresponds to the state of the interactive service at a given time. The interactive service may generate state data structures in regular intervals or upon detecting a change in the current state of the interactive service. Each state data structure may include a timestamp and/or identifier that corresponds to an instance in time when the state data structure is generated. The state data structures may be represented as a sequence of state data structures organized according to the time in which the state data structures are generated by the interactive service.

In some instances, upon detecting a control activation, the computing device may identify a particular state data structure that corresponds to when the control activation occurred (e.g., the fourth time). For example, the computing device may identify the particular state data structure by subtracting the signal latency value (L) from the current time (T). The state data structure generated at T-L corresponds to the particular state data structure. Alternatively, the computing device may determine a quantity of state data structures generated over the signal latency value and subtract the quantity of state data structures from the current state to identify the particular state data structure.

The computing device may then determine an impact of the control activation on the interactive service using the particular state data structure. In some instances, the computing device or the interactive service may modify the particular state data structure on the second input. The computing device may then determine the current state of the interactive service based on the modification to the particular state data structure. In some examples, determining the current state of the interactive service may include modifying one or more additional state data structures that were generated after the particular state data structure. In those examples, after the particular state data structure is modified, the computing device or interactive service may modify the next state data structure in the sequence of state data structures (e.g., the state data structure generated after the particular state data structure) based on the modified particular state data structure. The computing device or interactive service may then modify the state data structure in the sequence of state data structures after the next state data structure based on the modified next state data structure. The process may continue until the current state data structure is modified implementing the second input as if it is received at the fourth time. In other instances, the computing device or the interactive service may modify the current state of the interactive service based on the second input.

Figure 13:
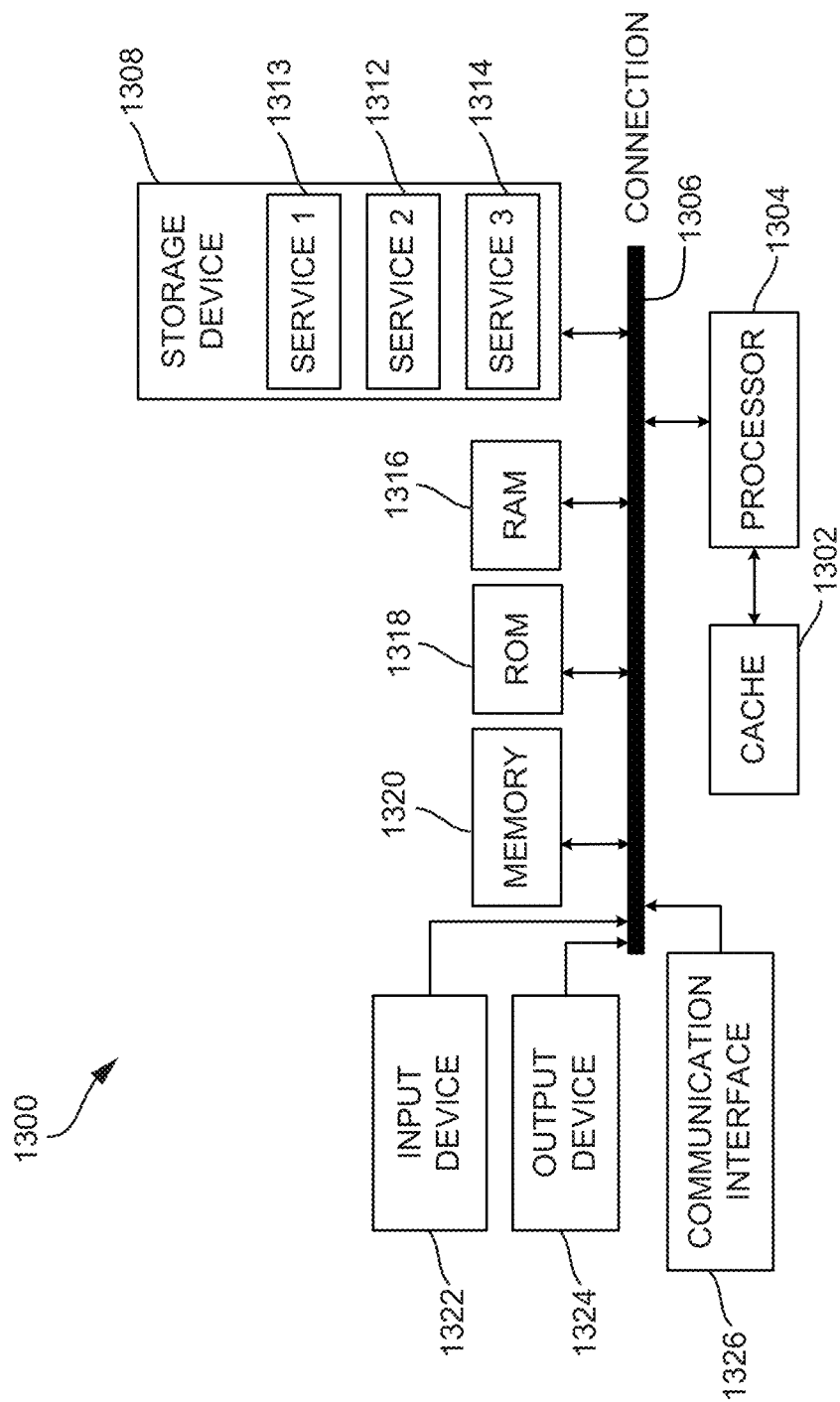
FIG. 13 illustrates an example computing device according to aspects of the present disclosure.

FIG. 13 illustrates an example computing device according to aspects of the present disclosure. For example, computing device 1300 can implement any of the systems or methods described herein. In some instances, computing device 1300 may be a component of or included within a media device. The components of computing device 1300 are shown in electrical communication with each other using connection 1306, such as a bus. The example computing device architecture 1300 includes a processor (e.g., CPU, processor, or the like) 1304 and connection 1306 (e.g., such as a bus, or the like) that is configured to couple components of computing device 1300 such as, but not limited to, memory 1320, read only memory (ROM) 1318, random access memory (RAM) 1316, and/or storage device 1308, to processing unit 1310.

Computing device 1300 can include a cache 1302 of high-speed memory connected directly with, in close proximity to, or integrated within processor 1304. Computing device 1300 can copy data from memory 1320 and/or storage device 1308 to cache 1302 for quicker access by processor 1304. In this way, cache 1302 may provide a performance boost that avoids delays while processor 1304 waits for data. Alternatively, processor 1304 may access data directly from memory 1320, ROM 1317, RAM 1316, and/or storage device 1308. Memory 1320 can include multiple types of homogenous or heterogeneous memory (e.g., such as, but not limited to, magnetic, optical, solid-state, etc.).

Storage device 1308 may include one or more non-transitory computer-readable media such as volatile and/or non-volatile memories. A non-transitory computer-readable medium can store instructions and/or data accessible by computing device 1300. Non-transitory computer-readable media can include, but is not limited to magnetic cassettes, hard-disk drives (HDD), flash memory, solid state memory devices, digital versatile disks, cartridges, compact discs, random access memories (RAMs) 1325, read only memory (ROM) 1320, combinations thereof, or the like.

Storage device 1308, may store one or more services, such as service 1 1310, service 2 1312, and service 3 1314, that are executable by processor 1304 and/or other electronic hardware. The one or more services include instructions executable by processor 1304 to: perform operations such as any of the techniques, steps, processes, blocks, and/or operations described herein; control the operations of a device in communication with computing device 1300; control the operations of processing unit 1310 and/or any special-purpose processors; combinations therefor; or the like. Processor 1304 may be a system on a chip (SOC) that includes one or more cores or processors, a bus, memories, clock, memory controller, cache, other processor components, and/or the like. A multi-core processor may be symmetric or asymmetric.

Computing device 1300 may include one or more input devices 1322 that may represent any number of input mechanisms, such as a microphone, a touch-sensitive screen for graphical input, keyboard, mouse, motion input, speech, media devices, sensors, combinations thereof, or the like. Computing device 1300 may include one or more output devices 1324 that output data to a user. Such output devices 1324 may include, but are not limited to, a media device, projector, television, speakers, combinations thereof, or the like. In some instances, multimodal computing devices can enable a user to provide multiple types of input to communicate with computing device 1300. Communications interface 1326 may be configured to manage user input and computing device output. Communications interface 1326 may also be configured to managing communications with remote devices (e.g., establishing connection, receiving/transmitting communications, etc.) over one or more communication protocols and/or over one or more communication media (e.g., wired, wireless, etc.).

The process of FIG. 12 may be executed for each wireless controller providing input to the interactive service. Alternatively, the process of FIG. 12 may be executed for a first wireless controller to generate a first signal latency value. The computing device or interactive service may define the signal latency value of the one or more other wireless controllers to be the first signal latency value.

Computing device 1300 is not limited to the components as shown if FIG. 13. Computing device 1300 may include other components not shown and/or components shown may be omitted.

The term "computer-readable medium" includes, but is not limited to, portable or non-portable storage devices, optical storage devices, and various other mediums capable of storing, containing, or carrying instruction(s) and/or data.

A computer-readable medium may include a non-transitory medium in which data can be stored in a form that excludes carrier waves and/or electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Some portions of this description describe examples in terms of algorithms and symbolic representations of operations on information. These operations, while described functionally, computationally, or logically, may be implemented by computer programs or equivalent electrical circuits, microcode, or the like. Furthermore, arrangements of operations may be referred to as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module can be implemented with a computer-readable medium storing computer program code, which can be executed by a processor for performing any or all of the steps, operations, or processes described.

Some examples may relate to an apparatus or system for performing any or all of the steps, operations, or processes described. The apparatus or system may be specially constructed for the required purposes, and/or it may comprise a general-purpose computing device selectively activated or reconfigured by a computer program stored in memory of computing device. The memory may be or include a non-transitory, tangible computer readable storage medium, or any type of media suitable for storing electronic instructions, which may be coupled to a bus. Furthermore, any computing systems referred to in the specification may include a single processor or multiple processors.

While the present subject matter has been described in detail with respect to specific examples, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual examples may be described herein as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method comprising:
   presenting, by a media device, a first cue at a first time;
   receiving, in response to presenting the first cue, a first input from a wireless device at a second time, wherein the first input indicates that a first control of the wireless device associated with the first cue has been activated;
   defining a first signal latency value based on the first time and the second time, wherein the first signal latency value corresponds to an estimated quantity of time before data transmitted by the wireless device will be received by the media device;
   receiving, at a third time, a second input from the wireless device that includes an indication of a second control activation; and
   processing the second control activation as if the second control activation is received at a fourth time that is prior to the third time, wherein a time interval between the fourth time and the third time is equal to the first signal latency value.

2. The method of claim 1, wherein the first cue is a visual cue.

3. The method of claim 1, wherein the first cue is an auditory cue.

4. The method of claim 1, wherein the first input is received from the wireless device using a Bluetooth communications protocol.

5. The method of claim 1, wherein processing the second control activation includes:
   identifying a first state data structure corresponding to a first state of a service at the fourth time; and
   modifying a second state data structure corresponding to a second state of the service at the third time using the second control activation and the first state data structure.

6. The method of claim 1, further comprising:
   detecting, at a fifth time, light using an optical sensor;
   receiving, at a sixth time, a first data packet from the wireless device; and
   defining a second signal latency value based on the fifth time and the sixth time, wherein the first signal latency value is further based on the second signal latency value.

7. The method of claim 1, wherein the wireless device is a wireless controller configured for use with an interactive service.

8. A system comprising:
   one or more processors; and
   a machine-readable storage medium storing instructions that when executed by the one or more processors, cause the one or more processors to perform operations including:
      presenting, by a media device, a first cue at a first time;
      receiving, in response to presenting the first cue, a first input from a wireless device at a second time, wherein the first input indicates that a first control of the wireless device associated with the first cue has been activated;
      defining a first signal latency value based on the first time and the second time, wherein the first signal latency value corresponds to an estimated quantity of time before data transmitted by the wireless device will be received by the media device;
      receiving, at a third time, a second input from the wireless device that includes an indication of a second control activation; and processing the second control activation as if the second control activation is received at a fourth time that is prior to the third time, wherein a time interval between the fourth time and the third time is equal to the first signal latency value.

9. The system of claim 8, wherein the first cue is a visual cue.

10. The system of claim 8, wherein the first cue is an auditory cue.

11. The system of claim 8, wherein the first input is received from the wireless device using a Bluetooth communications protocol.

12. The system of claim 8, wherein processing the second control activation includes:
   identifying a first state data structure corresponding to a first state of a service at the fourth time; and
   modifying a second state data structure corresponding to a second state of the service at the third time using the second control activation and the first state data structure.

13. The system of claim 8, wherein the operations further include:
   detecting, at a fifth time, light using an optical sensor;
   receiving, at a sixth time, a first data packet from the wireless device; and
   defining a second signal latency value based on the fifth time and the sixth time, wherein the first signal latency value is further based on the second signal latency value.

14. The system of claim 8, wherein the wireless device is a wireless controller configured for use with an interactive service.

15. A non-transitory machine-readable storage medium storing instructions that when executed by one or more processors, cause the one or more processors to perform operations including:
   presenting, by a media device, a first cue at a first time;
   receiving, in response to presenting the first cue, a first input from a wireless device at a second time, wherein the first input indicates that a first control of the wireless device associated with the first cue has been activated;
   defining a first signal latency value based on the first time and the second time, wherein the first signal latency value corresponds to an estimated quantity of time before data transmitted by the wireless device will be received by the media device;
   receiving, at a third time, a second input from the wireless device that includes an indication of a second control activation; and
   processing the second control activation as if the second control activation is received at a fourth time that is prior to the third time, wherein a time interval between the fourth time and the third time is equal to the first signal latency value.

16. The non-transitory machine-readable storage medium of claim 15, wherein the first cue is a visual cue.

17. The non-transitory machine-readable storage medium of claim 15, wherein the first input is received from the wireless device using a Bluetooth communications protocol.

18. The non-transitory machine-readable storage medium of claim 15, wherein processing the second control activation includes:
   identifying a first state data structure corresponding to a first state of a service at the fourth time; and
   modifying a second state data structure corresponding to a second state of the service at the third time using the second control activation and the first state data structure.

19. The non-transitory machine-readable storage medium of claim 15, wherein the operations further include:
   detecting, at a fifth time, light using an optical sensor;
   receiving, at a sixth time, a first data packet from the wireless device; and
   defining a second signal latency value based on the fifth time and the sixth time, wherein the first signal latency value is further based on the second signal latency value.

20. The non-transitory machine-readable storage medium of claim 15, wherein the wireless device is a wireless controller configured for use with an interactive service.

* * * * *